United States Patent
Zach et al.

(10) Patent No.: US 12,294,476 B2
(45) Date of Patent: May 6, 2025

(54) TRANSMIT PRECODING FOR PEAK TO AVERAGE POWER RATIO REDUCTION

(71) Applicant: QUALCOMM Incorporated, San Diego, CA (US)

(72) Inventors: Noam Zach, Kiryat Ono (IL); Guy Wolf, Rosh Haayin (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 17/718,950

(22) Filed: Apr. 12, 2022

(65) Prior Publication Data

US 2023/0327933 A1    Oct. 12, 2023

(51) Int. Cl.
*H04L 12/00* (2006.01)
*H04B 7/06* (2006.01)
*H04L 27/26* (2006.01)

(52) U.S. Cl.
CPC ....... *H04L 27/2617* (2013.01); *H04B 7/0617* (2013.01); *H04B 7/0639* (2013.01)

(58) Field of Classification Search
CPC ............. H04L 27/2617; H04L 27/2626; H04L 27/2647; H04B 7/0617; H04B 7/0639; H04B 7/0456
USPC ........................................................ 370/329
See application file for complete search history.

(56) References Cited

U.S. PATENT DOCUMENTS

| | | | |
|---|---|---|---|
| 8,873,533 B2* | 10/2014 | Hammarwall | H04L 27/2614 370/344 |
| 9,374,256 B2* | 6/2016 | Lozhkin | H04L 1/0003 |
| 9,893,919 B2* | 2/2018 | Kim | H04L 27/2082 |
| 2008/0132176 A1* | 6/2008 | Tudosoiu | H03F 3/24 455/574 |
| 2011/0228758 A1* | 9/2011 | Hammarwall | H04L 27/2614 370/344 |
| 2017/0134205 A1* | 5/2017 | Kim | H04L 27/2623 |

(Continued)

FOREIGN PATENT DOCUMENTS

WO    WO-2010055391 A1 *   5/2010    ......... H04L 27/2614

OTHER PUBLICATIONS

Myung et al., Peak Power Characteristics of Single Carrier FDMA MIMO Precoding System, 2007, IEEE, pp. 477-481 (Year: 2007).*

*Primary Examiner* — Frantz Coby
(74) *Attorney, Agent, or Firm* — Arent Fox, LLP

(57) ABSTRACT

In a wireless communication system, a peak to average power ratio (PAPR) may affect the efficiency of a power amplifier. To reduce a PAPR, a transmitting device may utilize a PAPR reduction precoding that changes a received signal without performance impact so the overall transmit PAPR is reduced. The transmitting device constructs a frequency domain (FD) response to the PAPR reduction precoding, estimates a channel to one or more receiving devices, and applies the PAPR reduction precoding to the estimated channel. The transmitting device constructs a multiple input multiple output (MIMO) precoding matrix considering the FD response of the PAPR reduction precoding and applies the MIMO precoding matrix and the PAPR reduction precoding to an FD signal. A receiving device applies the FD response conjugated to a received FD signal from the transmitting device and processes at least a received reference signal based on the PAPR reduction precoder.

27 Claims, 16 Drawing Sheets

(56) References Cited

U.S. PATENT DOCUMENTS

| | | | |
|---|---|---|---|
| 2021/0328847 A1* | 10/2021 | Zach | .................... H04B 7/0617 |
| 2023/0133797 A1* | 5/2023 | Jiang | ................... H04L 27/2623 |
| | | | 370/330 |

\* cited by examiner

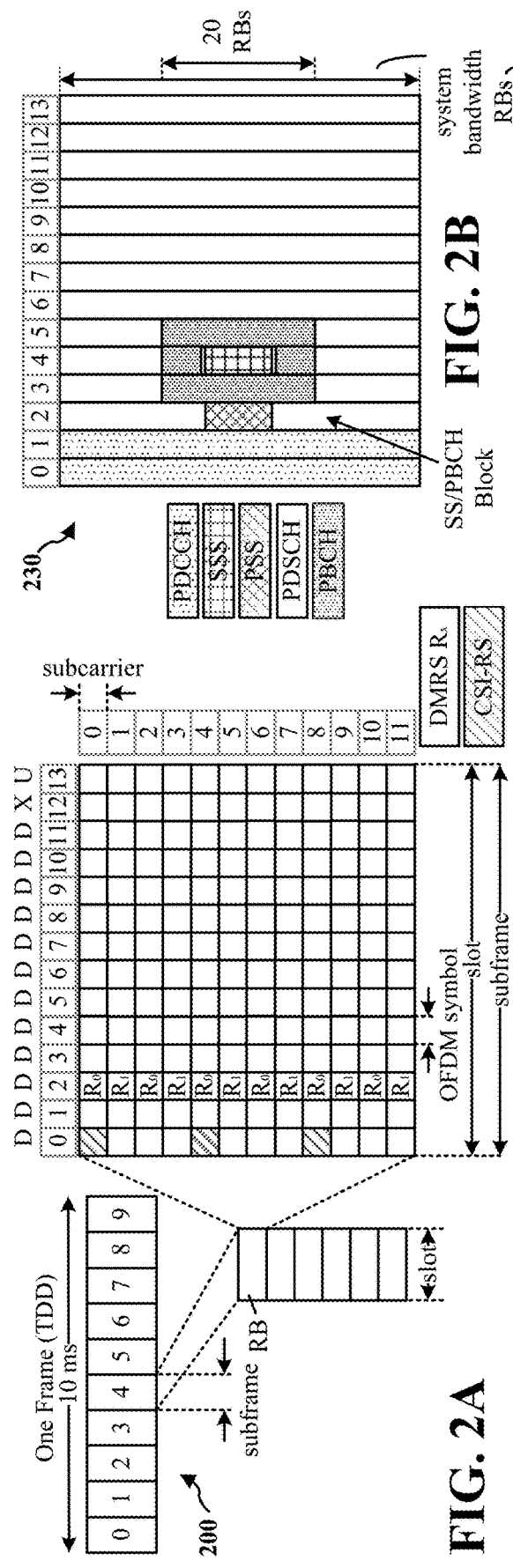
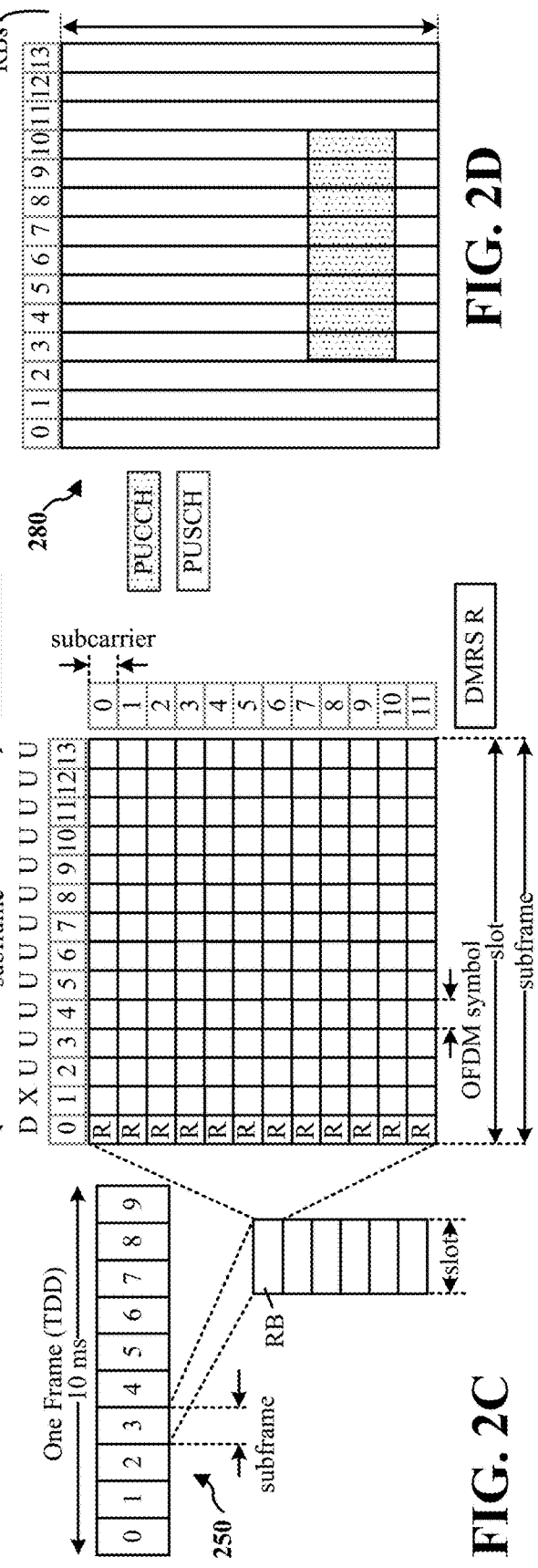
FIG. 2A
FIG. 2B
FIG. 2C
FIG. 2D

TRANSMIT PRECODING FOR PEAK TO AVERAGE POWER RATIO REDUCTION

BACKGROUND

Technical Field

The present disclosure relates generally to communication systems, and more particularly, to transmit precoding for peak to average power ratio (PAPR) reduction.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In another aspect, the disclosure provides a method, a non-transitory computer-readable medium, and an apparatus for a base station. The method includes constructing a frequency domain (FD) response to a peak to average power ratio (PAPR) reduction precoding. The method includes estimating a channel to one or more receiving devices. The method includes applying the PAPR reduction precoding to the estimated channel. The method includes constructing a multiple input multiple output (MIMO) precoding matrix considering the FD response of the PAPR reduction precoding. The method includes applying the MIMO precoding matrix and the PAPR reduction precoding to an FD signal for a transmission.

The present disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

In an aspect of the disclosure, a method, a non-transitory computer-readable medium, and an apparatus for a receiving device are provided. The method includes selecting a peak to average power ratio (PAPR) reduction precoder. The method includes constructing a frequency domain (FD) response to the PAPR reduction precoder. The method includes applying the FD response conjugated to a received FD signal from a transmitting device. The method includes processing a received reference signal within the received FD signal based on the PAPR precoder.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the present description.

FIG. 2B is a diagram illustrating an example of downlink (DL) channels within a subframe, in accordance with certain aspects of the present description.

FIG. 2C is a diagram illustrating an example of a second frame, in accordance with certain aspects of the present description.

FIG. 2D is a diagram illustrating an example of uplink (UL) channels within a subframe, in accordance with certain aspects of the present description.

DETAILED DESCRIPTION

Figure 1:
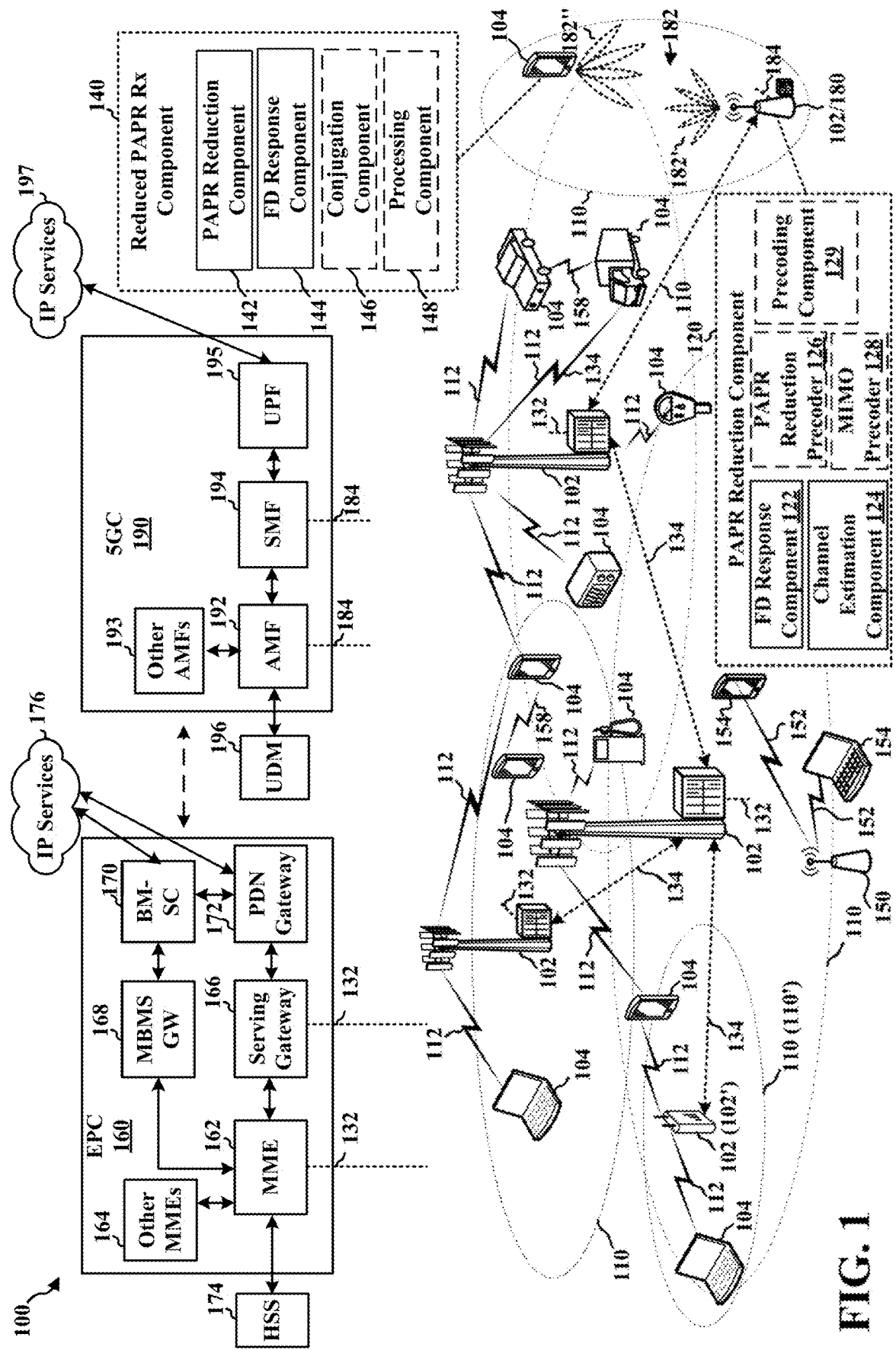
FIG. 1 is a diagram illustrating an example of a wireless communications system including an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Power consumption is a concern for wireless devices including both base stations and user equipment (UE). Although a base station may have a constant power supply, power consumption may be a significant cost for a network operator. Orthogonal frequency division multiple access (OFDMA) has many advantages such as enabling simple channel estimation at the receiver, flexibility in utilizing the available time/frequency resources, etc. However, OFDMA may have an increased peak to average power ratio (PAPR) compared to single carrier techniques.

A power amplifier may be most efficient when a working point is close to a non-linear part of a power output curve. When PAPR is high, the power amplifier may need a large backoff to operate effectively. With a lower PAPR, the power amplifier may use a lower backoff and operate in a more efficient region. Accordingly, reducing PAPR may reduce power consumption by improving efficiency of a power amplifier.

One technique for reducing PAPR is space frequency multi-user (SFMU) PAPR reduction. In SFMU PAPR reduction, PAPR improvement is achieved by using the plurality of degrees of freedom available in a system of Multi-User and Massive multiple-input multiple-output (MIMO). SFMU PAPR schemes propose to project PAPR reduction signals onto the orthogonal (or null) sub-space relative to the serving beam sub-space. However, when the delay spread of the channel is relatively small, and the mean delay is common to all channel links (for all Tx-Rx pairs), the signal may not have large spatial diversity, which limits the potential gain from null-space projection. For example, when the delay spread of the channel is relatively small, and the mean delay is common to all channel links, the PAPR reduction signal that reduces the time domain (TD) peaks is mainly in the direction of the data signal. Thus, when projecting the PAPR reduction signal to the null-space of the data signal—most of the energy of the PAPR reduction signal is not transmitted and the PAPR reduction is moderate.

In an aspect, the present disclosure provides for applying a PAPR reduction precoding to a frequency domain (FD) signal for transmission in order to increase the spatial diversity of the signal. The increased spatial diversity may increase the transmitted energy of the PAPR reduction signal after projection to the null-space. For frequency selective channels, a MIMO precoder (e.g., a singular value decomposition (SVD) matrix or zero force (ZF) precoding matrix, based on the application) will vary in frequency and the spatial diversity is therefore naturally enhanced. For relatively flat channels, a transmitter may use precoding perturbation on the baseline calculated MIMO precoder to achieve spatial diversity.

While PAPR reduction precoding settings could be transparent for data decoding that uses precoded pilots (e.g., DMRS), the decoding of other signals such as the synchronization signal (SYNC), tracking reference signal (TRS), channel state information reference signal (CSI-RS), a cell-specific reference signal (CRS), etc. may utilize PAPR reduction precoding information that is signaled by the transmitter to the receiver. That is the PAPR reduction precoder may be known at the receiver. One example of a PAPR reduction precoder using precoding perturbation is applying single tap delay on the baseline wide band MIMO precoder. In some implementations, a perturbation rule may be defined in a standards document or regulation or may be signaled in control signaling from the transmitter to the receiver. The perturbation rule can be pre-defined and parameters thereof (e.g., the profile of delay(s)) may be signaled dynamically. The perturbation may be conditionally applied and signaled to the receiver by a "precoding perturbation" flag. When selecting wide band precoding in a channel state feedback (CSF) process, the UE may take potential perturbation into account.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The base stations 102 may include macrocells (high power cellular base station) and/or small cells (low power cellular base station). The macrocells include base stations. The small cells include femtocells, picocells, and microcells.

One or more of the UEs 104 may include a reduced PAPR Rx component 140 configured to receive a signal that has used a PAPR reduction precoding. The reduced PAPR Rx component 140 may include a PAPR reduction component 142 configured to select a PAPR reduction precoder. The reduced PAPR Rx component 140 may include a FD response component 144 configured to construct a FD response to the PAPR reduction precoder. The reduced PAPR Rx component 140 may include a conjugation component 146 configured to applying the FD response conjugated to a received FD signal from a transmitting device. The reduced PAPR Rx component 140 may include a processing component configured to process a received reference signal within the received FD signal based on the PAPR precoder.

In an aspect, one or more of the base stations 102 may include a PAPR reduction component 120 that applies a PAPR reduction precoding to a frequency domain signal to reduce PAPR. For example, the PAPR reduction component 120 may include a FD response component 122 configured to construct a FD response to a PAPR reduction precoding. The PAPR reduction component 120 may include a channel estimation component 124 configured to estimate a channel to one or more receiving devices. The PAPR reduction component 120 may include a PAPR reduction precoder 126 configured to apply the PAPR reduction precoding to the estimated channel. The PAPR reduction component 120 may include a MIMO precoder 128 configured to construct a MIMO precoding matrix considering the FD response of the PAPR reduction precoding. The PAPR reduction component 120 may include a precoding component 129 configured to apply the MIMO precoding matrix and the PAPR reduction precoding to an FD signal for a transmission.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and a physical sidelink feedback channel (PSFCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D are resource diagrams illustrating example frame structures and channels that may be used for uplink, downlink, and sidelink transmissions to a UE 104 including a reduced PAPR Rx component 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data and may additionally be used to carry a buffer status report (BSR), a power headroom report (PHR), and/or UCI.

Figure 3:
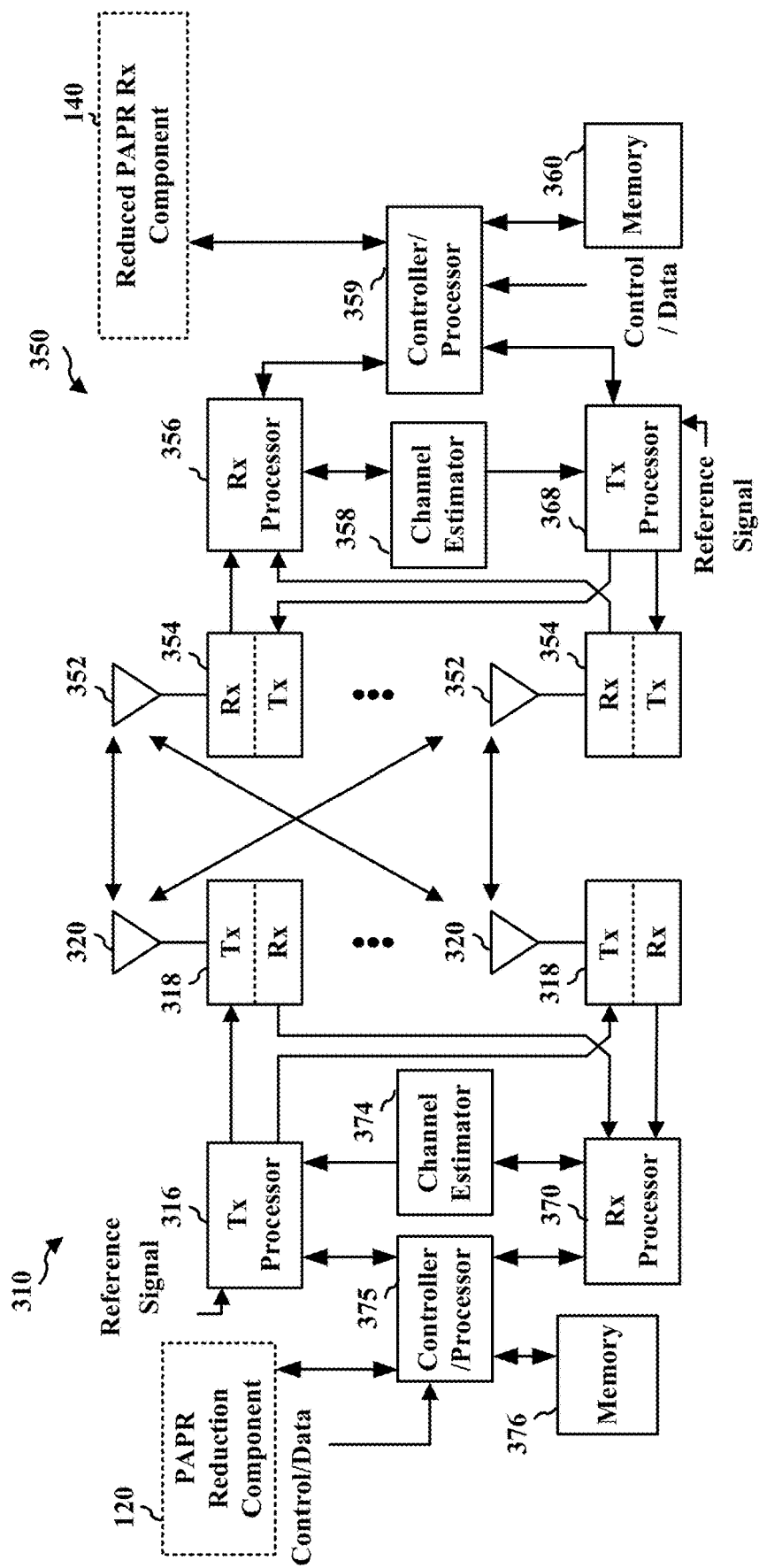
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate an RF carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the PAPR Rx component 140 of FIG. 1.

At least one of the Tx processor 316, the Rx processor 370, and the controller/processor 375 may be configured to perform aspects in connection with the PAPR reduction component 120 of FIG. 1.

Figure 4:
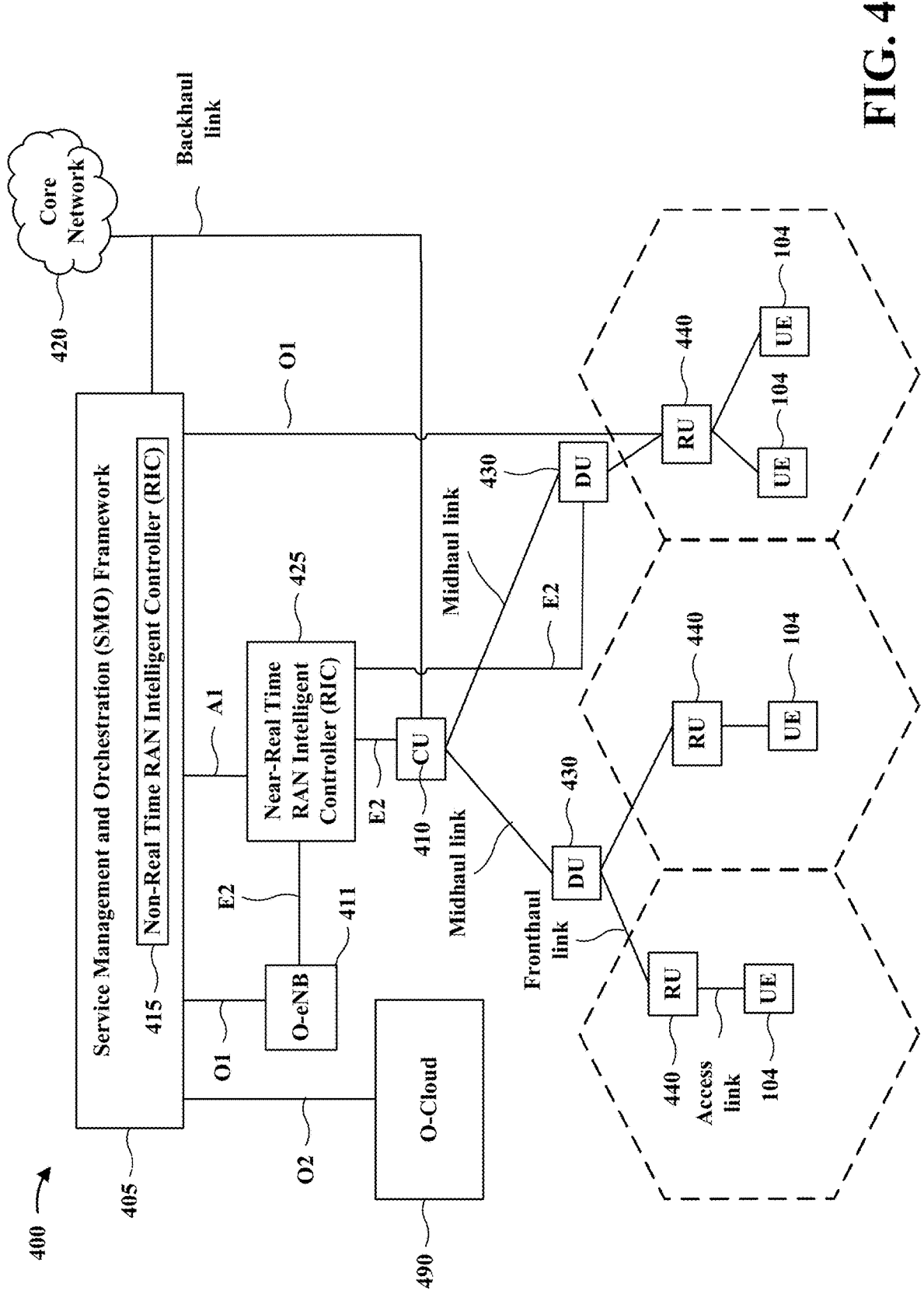
FIG. 4 shows a diagram illustrating an example disaggregated base station architecture.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415, and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
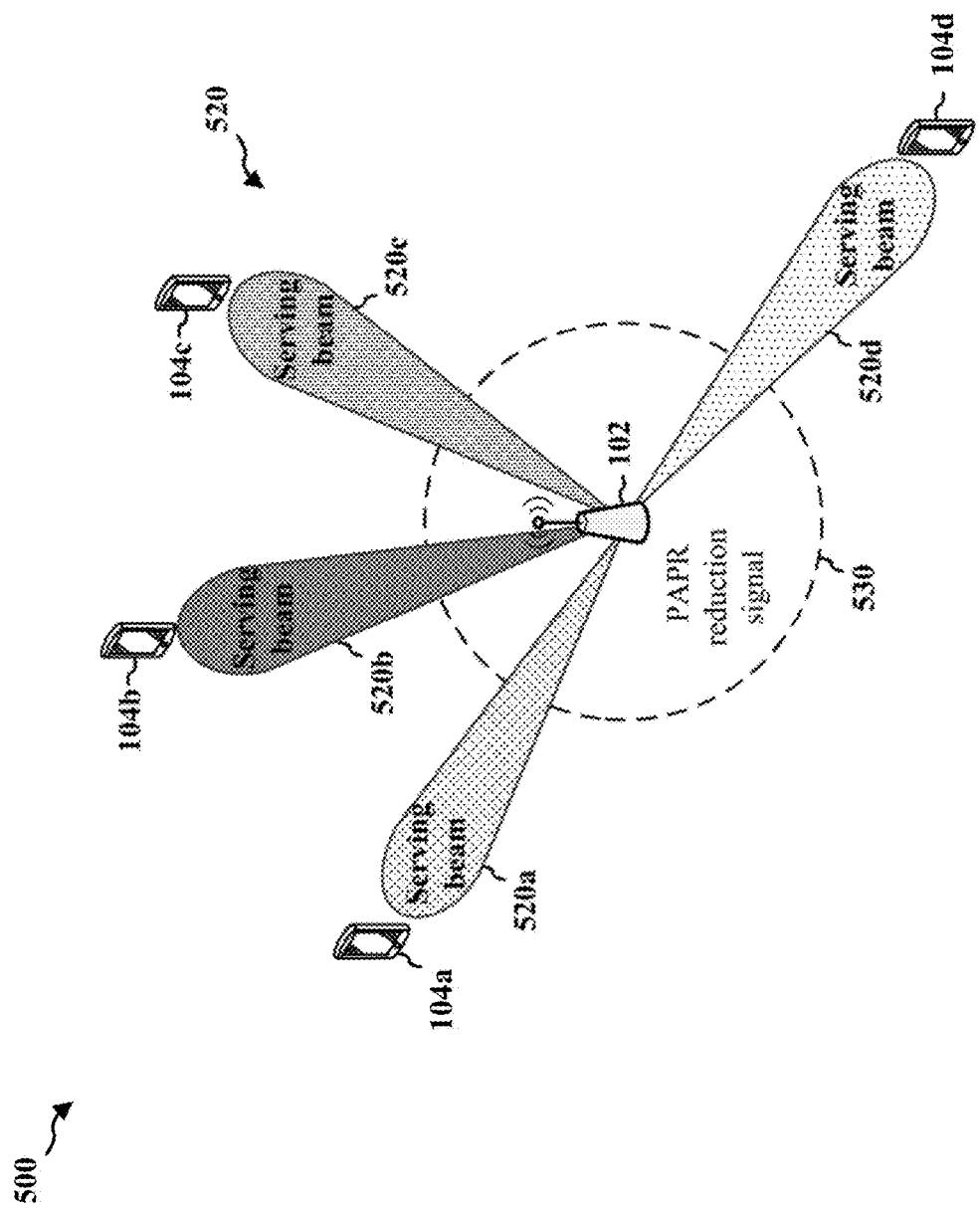
FIG. 5 is a diagram illustrating space frequency multi-user peak to average power (PAPR) reduction.

FIG. 5 is a diagram 500 illustrating space frequency multi-user PAPR reduction. A base station 102 may serve multiple UEs 104 (e.g., 104*a*, 104*b*, 104*c*, 104*d*). Each UE may be assigned a respective serving beam 520 (e.g., 520*a*, 520*b*, 520*c*, 520*d*). The serving beams 520 may point in different directions. A PAPR reduction signal 530 may be projected onto the orthogonal (or null) sub-space relative to a subspace of the serving beams 520. The PAPR reduction signal 530 may reduce the PAPR such that the power amplifier is able to operate in a linear region, thereby reducing non-linear impairments.

In some scenarios, however, the data signal to be transmitted may not have large spatial diversity. For example, the delay spread of the channel may be relatively small or the mean delay may be common to all channel links (e.g., for each UE 104). The PAPR reduction signal 530 that reduces the time domain (TD) peaks responsible for a high PAPR is mainly in the direction of the data signal. Thus, when projecting the PAPR reduction signal 530 to the null-space of the data signal, most of the energy of the PAPR reduction signal 530 is not transmitted and the PAPR reduction is moderate. According, potential gain from null-space projection may be relatively small.

In an aspect, the present disclosure utilizes a PAPR reduction precoding in addition to a MIMO precoding to increase the spatial diversity of the data signal, and thereby increase the transmitted energy of the PAPR reduction signal 530 after projection to the null-space. The PAPR reduction precoding may utilize precoding perturbation that changes the precoding over a frequency. In particular, the precoding perturbation may be effective in increasing diversity where a wideband MIMO precoder is used.

Figure 6:
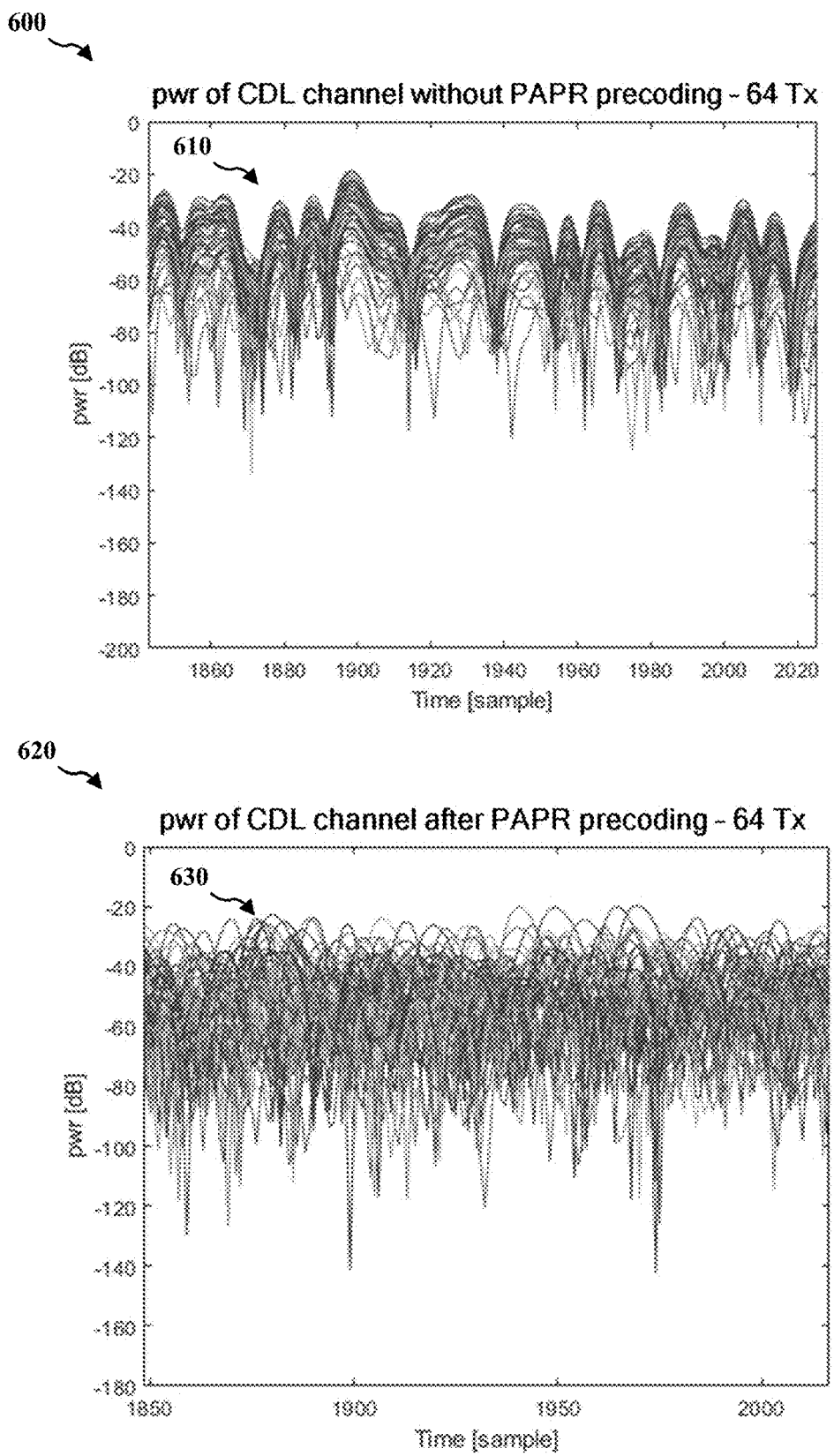
FIG. 6 is a diagram showing power of a channel using zero force MIMO precoding.

FIG. 6 is a diagram showing power of a channel using zero force MIMO precoding. In the chart 600, the profile of the signal 610 for each antenna follows a similar pattern. For instance, there is little delay spread between the signal for each antenna. Accordingly, generating a PAPR reduction signal for the signal 610 may experience the issue of limited power for the null-space projection. In the chart 620, the signal 610 is precoded with a PAPR reduction precoding to generate a signal 630. The profile of the signal 630 for each antenna may be different. Accordingly, the signal 630 may have greater spatial diversity than the signal 610, and the channel may create more degrees of freedom for null-space production of a PAPR reduction signal.

Figure 7:
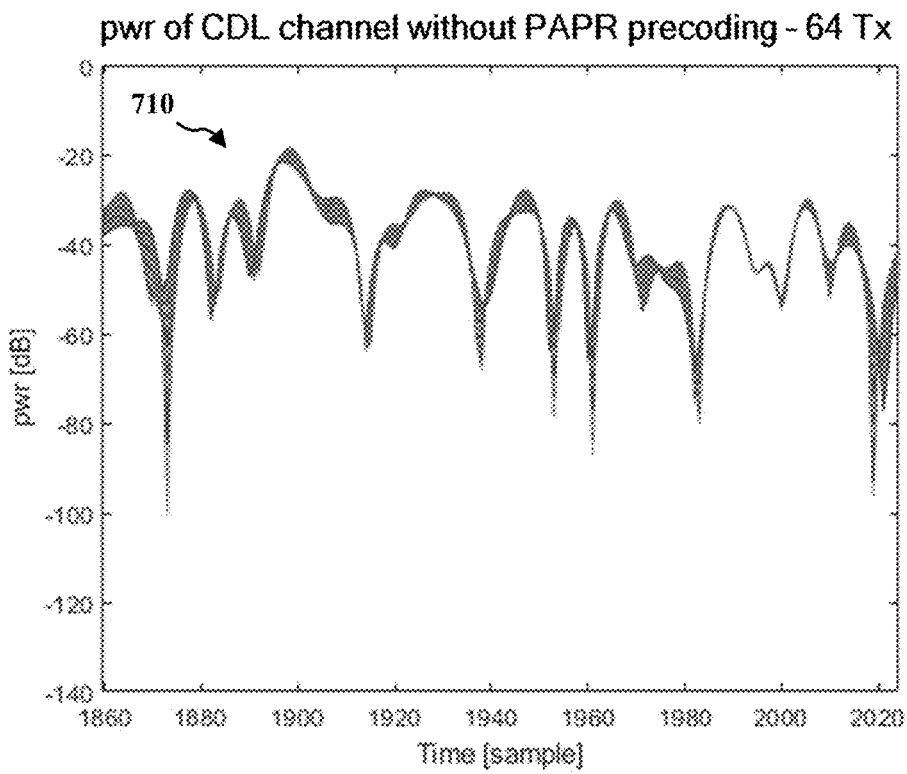
FIG. 7 is a diagram showing power of a channel using codebook MIMO precoding.
Figure 7:
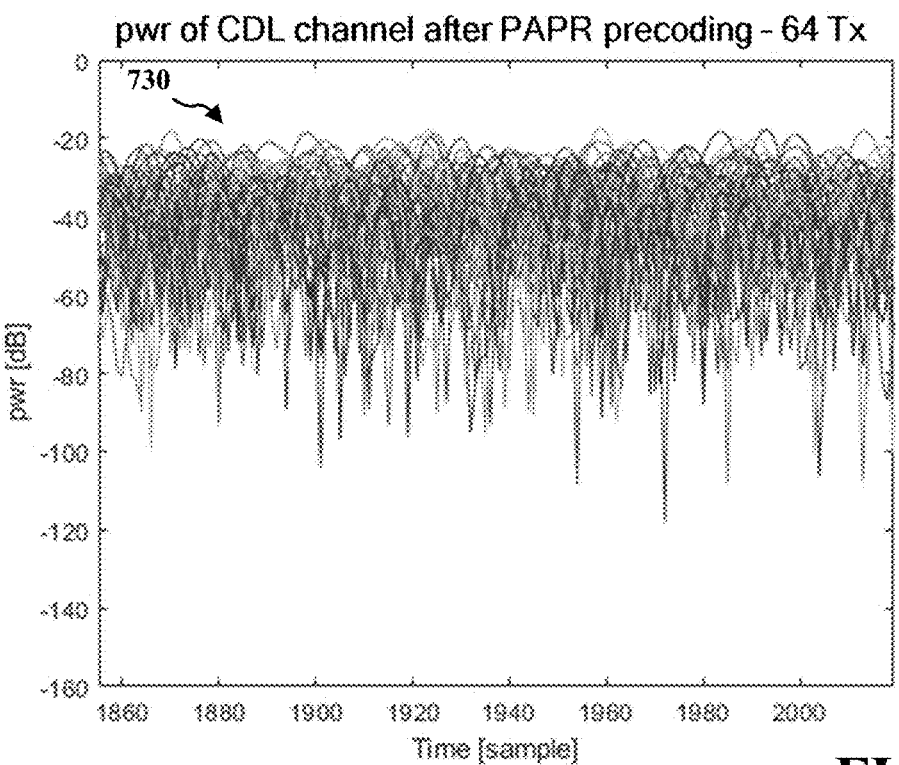

FIG. 7 is a diagram showing power of a channel using codebook MIMO precoding. In the chart 700, the profile of the signal 710 for each antenna follows a similar pattern. For instance, there is even less delay spread in the signal 710 between each antenna than for the signal 610 because the same codebook precoder is used. Accordingly, generating a PAPR reduction signal for the signal 710 may experience the issue of limited power for the null-space projection. In the chart 720, the signal 710 is precoded with a PAPR reduction precoding to generate a signal 730. The profile of the signal 730 for each antenna may be different. Accordingly, the signal 730 may have greater spatial diversity than the signal 710, and the channel may create more degrees of freedom for null-space production of a PAPR reduction signal.

Figure 8:
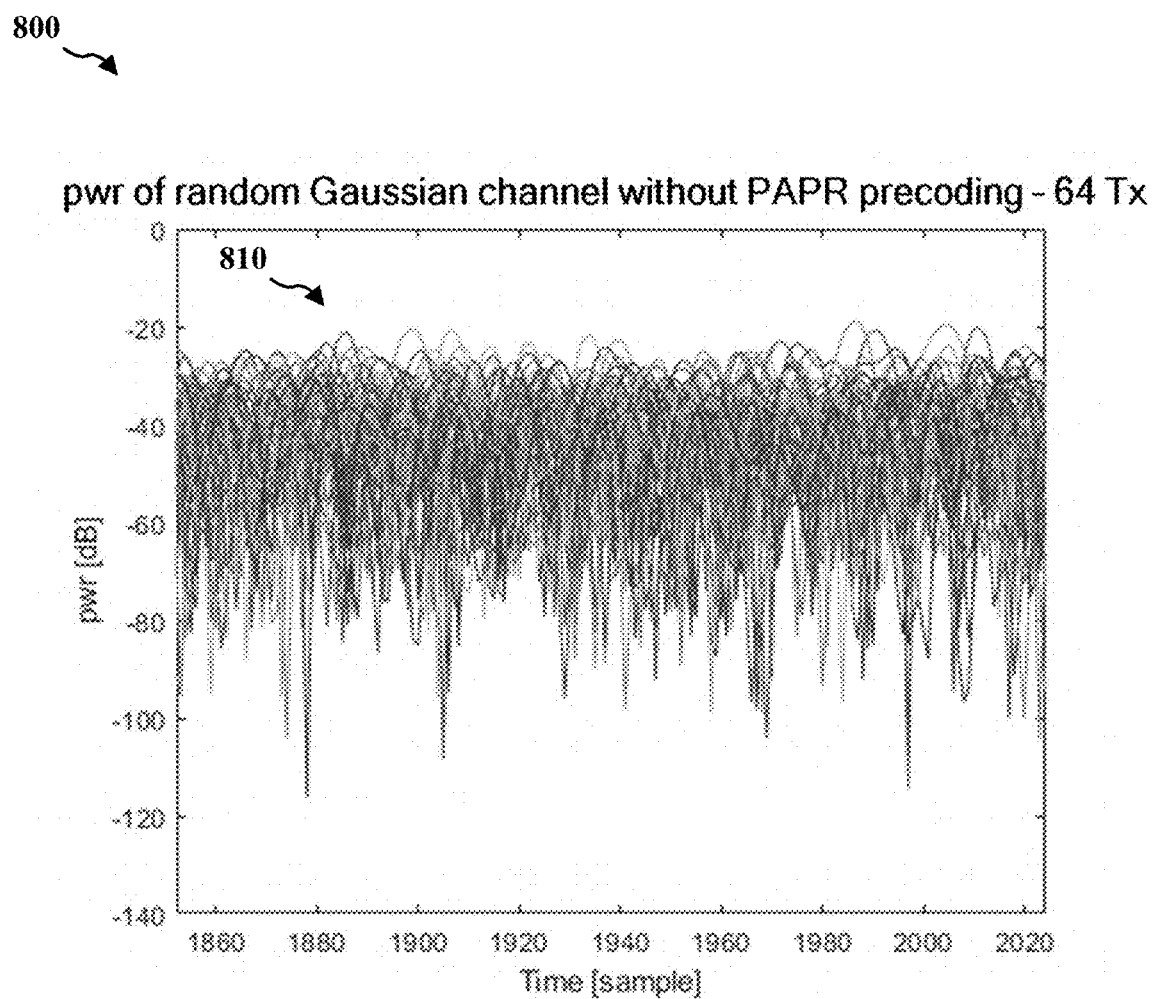
FIG. 8 is a diagram showing power of a random Gaussian channel.

FIG. 8 is a diagram showing power of a random Gaussian channel. In the chart 800, the channel 810 has relatively greater spatial diversity than the signals 610 and 710. The PAPR reduction precoding may generally cause a signal to have spatial diversity similar to a random Gaussian channel.

Figure 9:
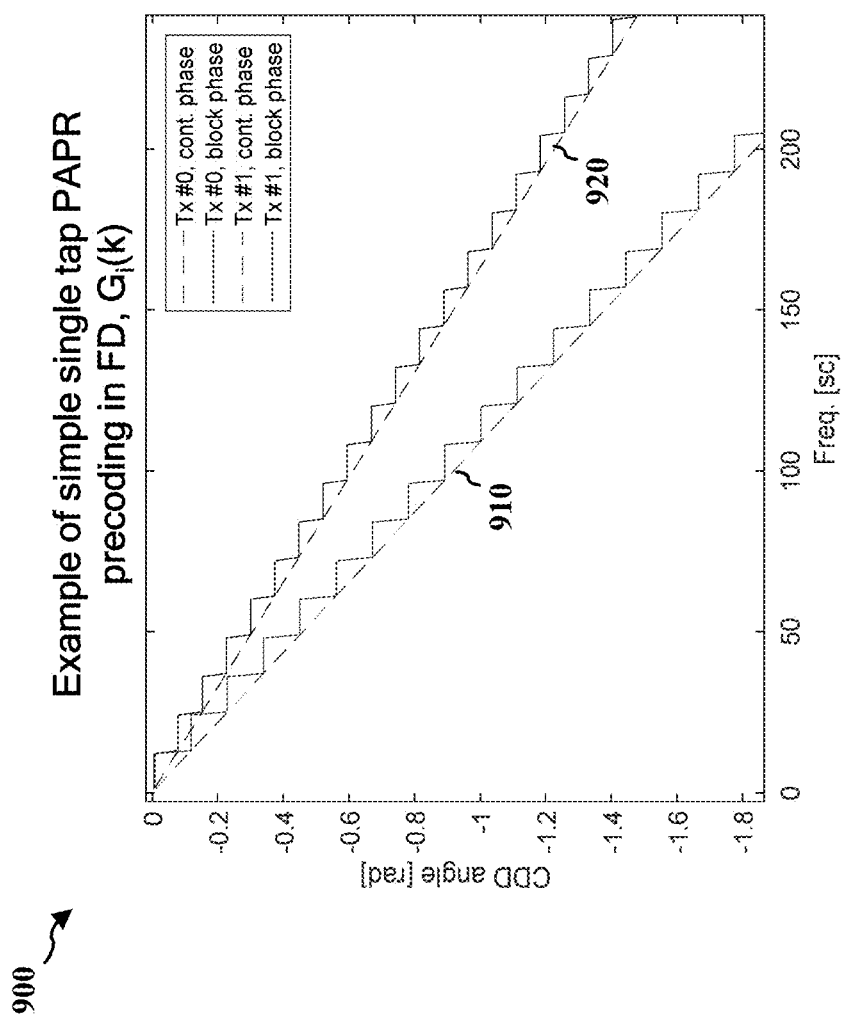
FIG. 9 is a diagram of an example PAPR reduction precoding scheme utilizing single tap cyclic delay diversity (CDD).

FIG. 9 is a diagram 900 of an example PAPR precoding scheme utilizing a single tap PAPR reduction precoding. In a simple example, a cyclic delay diversity (CDD) angle may be applied to subcarriers based on the frequency of the subcarrier. In some implementations, subcarriers may be bundled into precoding blocks (e.g., by resource block (RB) of 12 subcarriers), resulting in a step-like function of the CDD angle. Different parameters of the PAPR precoding scheme may adjust the pattern of the signal. For example, for a CDD based precoder, the rate of change of the CDD may be varied between a precoder 910 and a precoder 920. Generally, a PAPR reduction precoding may be defined by a precoding perturbation rule that defines how the precoding changes over frequency. A precoding perturbation rule may define more complex PAPR reduction precoding that achieves a desired spatial diversity. The precoding perturbation rule may be pre-configured, for example, specified in a standards document or regulation, or configured via system information or RRC signaling. In some implementations, a parameter of a precoding perturbation rule may be dynamically signaled. For instance, in the example of a CDD, the rate of change may be dynamically signaled.

Figure 10:
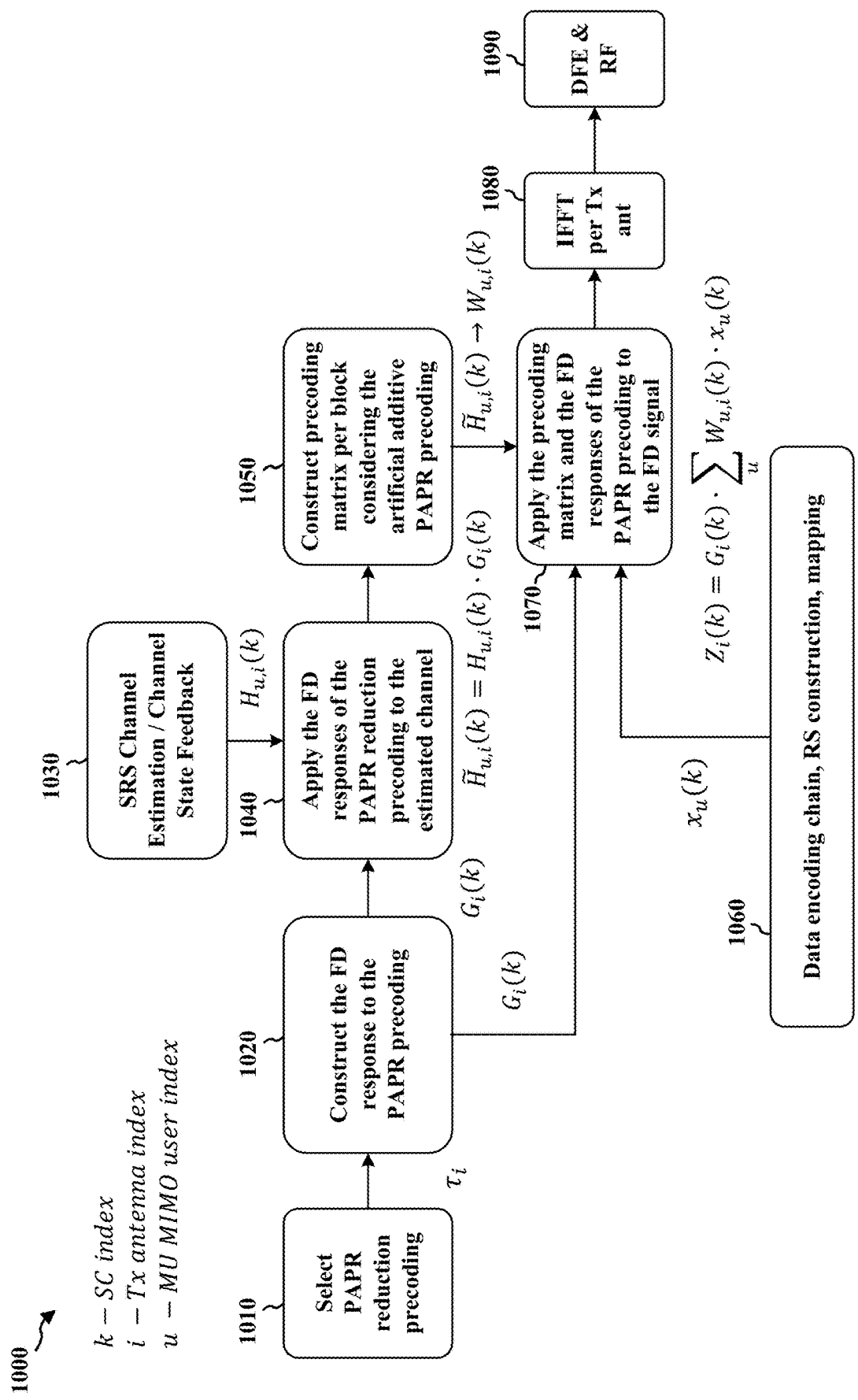
FIG. 10 is a diagram of example signal processing for a transmitting device utilizing PAPR reduction precoding.

FIG. 10 is a diagram 1000 of example signal processing for a transmitting device utilizing PAPR reduction precoding. At block 1010, the transmitting device may select a PAPR reduction precoding, which may be represented as it for each Tx antenna. At block 1020, the transmitting device may construct the FD response of each subcarrier index (k) to the PAPR precoding, which may be represented as $G_i(k)$ for each Tx antenna. At block 1030, the transmitting device may perform channel estimation. In some implementations, the channel estimation may be based on a sounding reference signal (SRS) transmitted by each UE 104, or the channel estimation may be based on channel state feedback (CSF). The channel estimation for each UE (u) may be represented as $H_{u,i}(k)$. At block 1040, the transmitting device may apply the FD responses of the PAPR reduction precoding to the estimated channel. For example, the estimated channel after PAPR reduction precoding may be represented as $\tilde{H}_{u,i}(k)=H_{u,i}(k) \cdot G_i(k)$. At block 1050, the transmitting device may construct a precoding matrix (e.g., MIMO precoder) considering the artificial additive PAPR precoding. For instance, the precoding matrix may be based on $\tilde{H}_{u,i}(k)$ and may be represented as $W_{u,i}(k)$. At block 1060, the transmitting device may utilize a data encoding chain, reference signal construction, and mapping to generate a FD signal, which may be represented as $x_u(k)$. At block 1070, the transmitting device may apply the precoding matrix and the FD responses of the PAPR reduction precoding to the FD signal for each user. For instance, the precoded frequency domain signal may be represented by the equation: $Z_i(k) = G_i(k) \cdot \Sigma_u W_{u,i}(k) \cdot x_u(k)$. At block 1080, the transmitting device may perform an IFFT per Tx on the precoded frequency domain signal $Z_i(k)$. At block 1090, the transmitting device may perform digital front end (DFE) processing and RF sampling.

Figure 11:
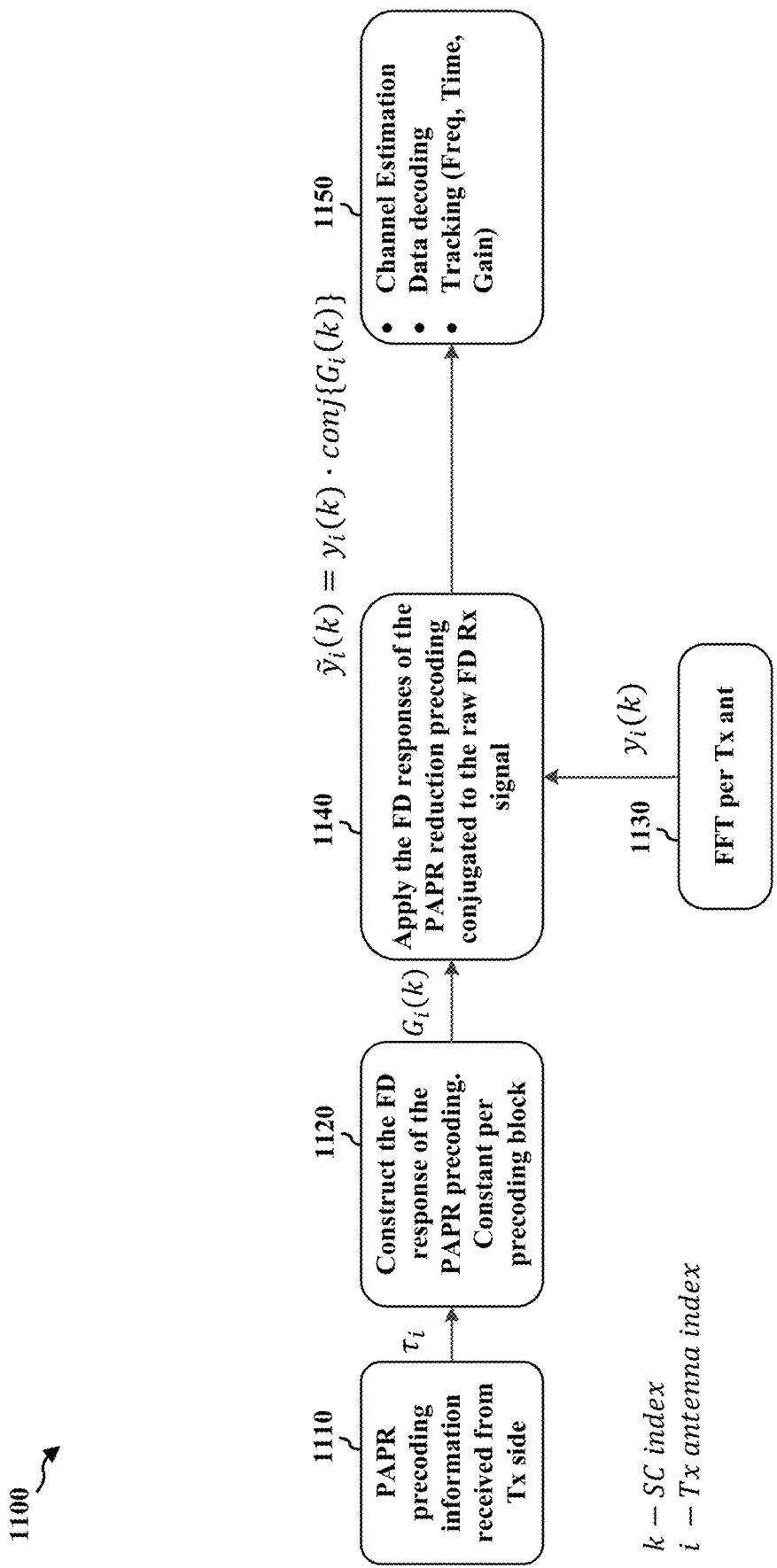
FIG. 11 is a diagram of example signal processing for a receiving device utilizing PAPR reduction precoding.

FIG. 11 is a diagram 1100 of example signal processing for a receiving device utilizing PAPR reduction precoding. At block 1110, the receiving device may select a PAPR reduction precoding, which may be represented as $\tau_i$ for each Tx antenna. The receiving device may select the same PAPR reduction precoder as the transmitting device, for example, based on a predefined precoder, a configuration, and/or dynamic signaling. At block 1120, the receiving device may construct the FD response of each subcarrier index (k) to the PAPR precoding, which may be represented as $G_i(k)$ for each Tx antenna. Accordingly, the receiving device may construct the same FD response as the transmitting device. At block 1130, the receiving device may receive a time domain signal and perform a FFT per Tx antenna. The result of the FFT is a received FD signal $y_i(k)$. At block 1140, the receiving device may apply the FD responses of the PAPR reduction precoding conjugated to the raw received FD signal. That is, the MIMO precoding may be transparent to the receive processing. The resulting signal may be expressed by the equation: $\hat{y}_i(k) = y_i(k) \cdot \text{conj}\{G_i(k)\}$. The receiving device may process the resulting signal. For example, the receiving device may perform channel estimation, data decoding, or tracking on the resulting signal.

Figure 12:
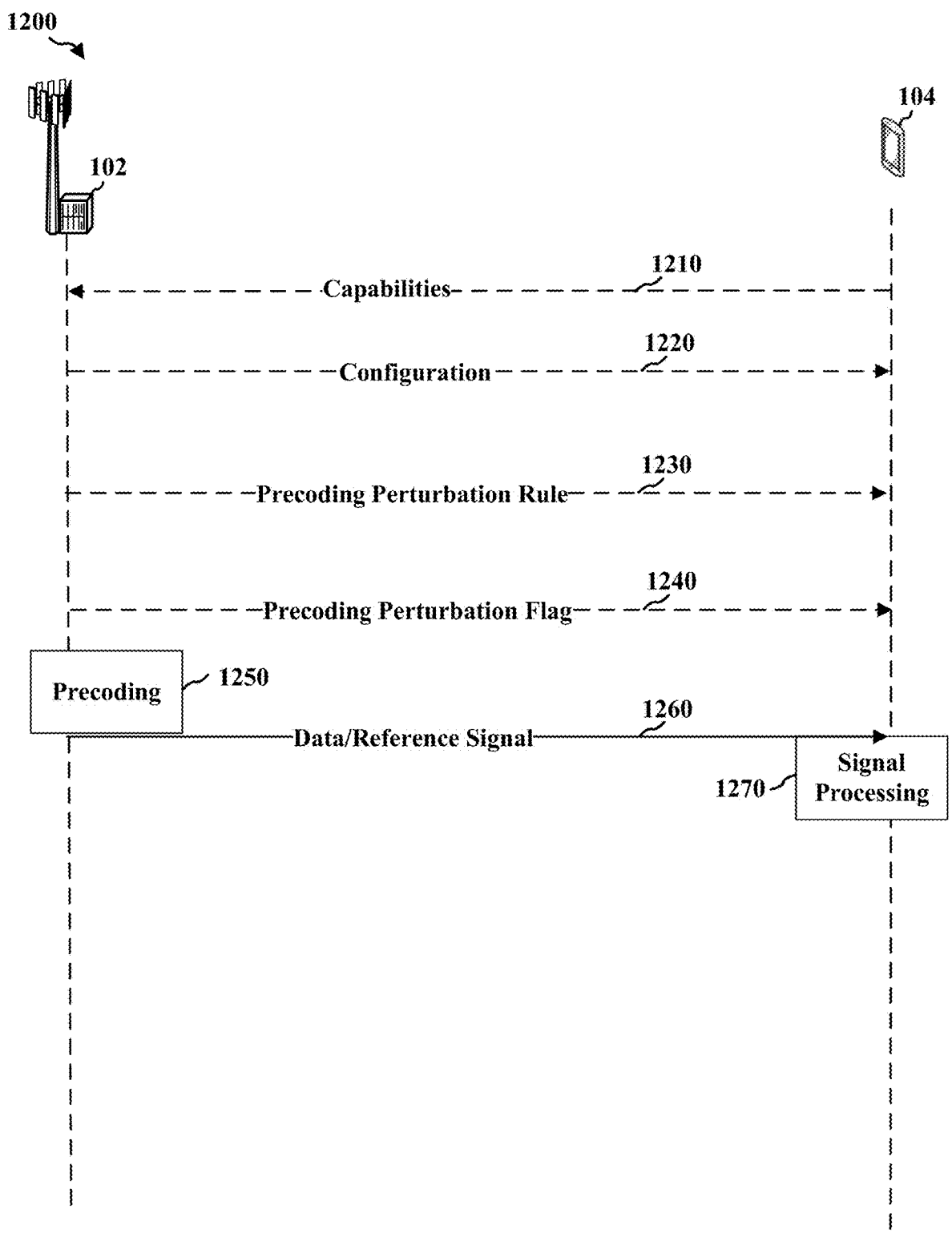
FIG. 12 is a message diagram illustrating example messages for transmissions with PAPR reduction signals.

FIG. 12 is a message diagram 1200 illustrating example messages for transmissions with PAPR reduction signals. A UE 104 may optionally transmit capabilities 1210. For example, the capabilities 1210 may indicate a capability of the UE to receive a signal that uses PAPR reduction precoding. The base station 102 may optionally transmit a configuration 1220. For instance, the configuration 1220 may configure one or more precoding perturbation rules. The base station 102 may optionally transmit a precoding perturbation rule 1230. For example, the precoding perturbation rule 1230 may be an indication of a precoding perturbation rule that is defined in a standards document or regulation, or a precoding perturbation rule configured by the configuration 1220. In some implementations, the precoding perturbation rule 1230 includes parameters of a predefined perturbation rule. For example, where a PAPR reduction precoder is defined by a single tap CDD, the precoding perturbation rule 1230 may define a slope of the CDD over the subcarriers. In some implementations, the base station 102 may transmit a precoding perturbation flag 1240. For example, the precoding perturbation flag 1240 may indicate that a PAPR reduction precoder is to be applied to a transmission. For instance, the precoding perturbation flag 1240 may be included in a DCI scheduling the transmission.

At block 1250, the base station 102 may perform precoding. For example, the base station may perform precoding based on both the PAPR reduction precoder and a MIMO precoder as discussed above with respect to FIG. 10. The base station 102 may transmit a signal 1260 to one or more UEs including the UE 104. The signal 1260 may include both data (e.g., PDSCH) and reference signals (e.g., DMRS, TRS, CSI-RS, or CRS). At block 1270, the UE 104 may perform signal processing. For example, the signal processing may be based on the PAPR reduction precoder as discussed above regarding FIG. 11. In some implementations, the MIMO precoding may be transparent to the receiving device such as the UE 104 and may be accounted for via channel estimation.

Figure 13:
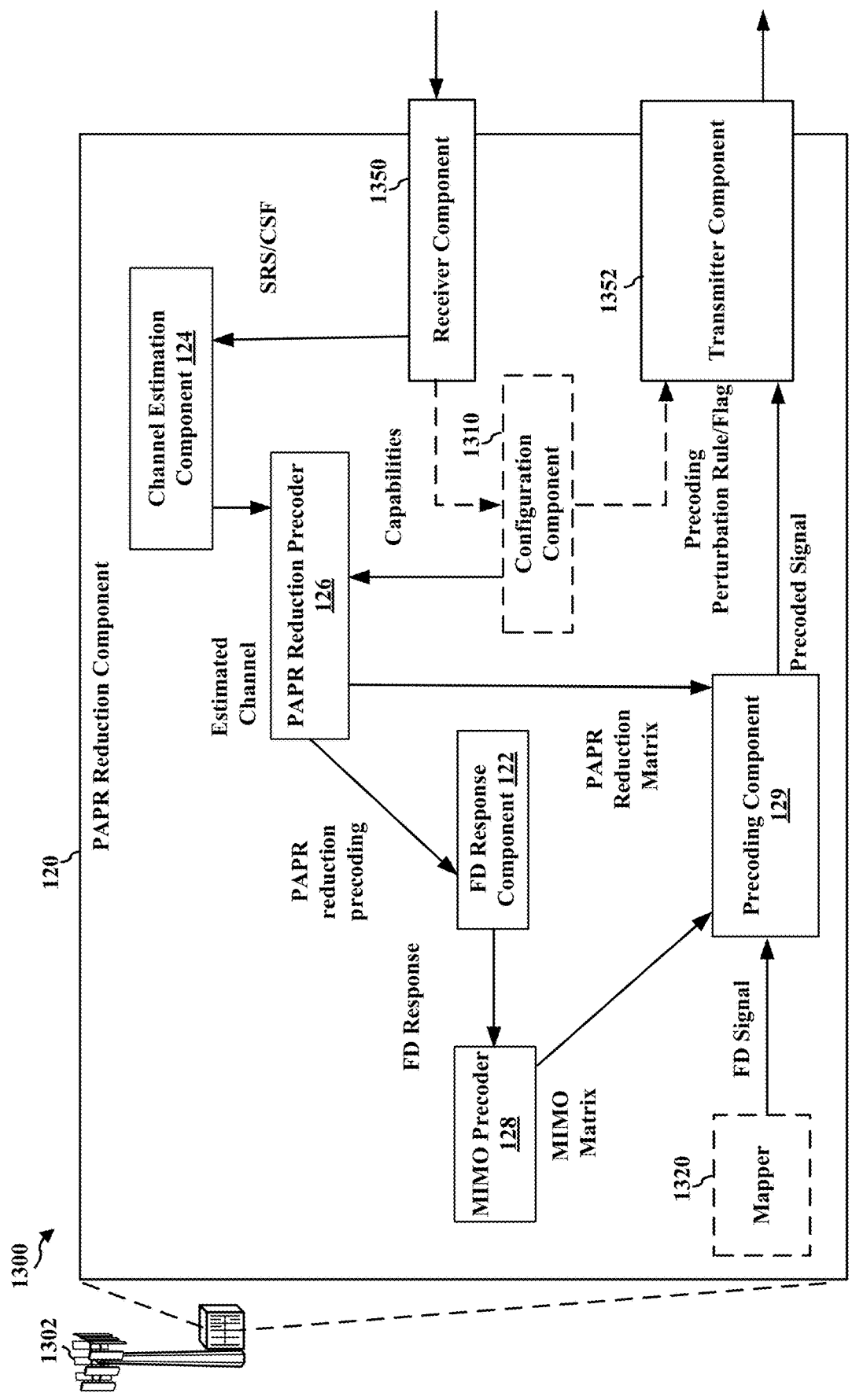
FIG. 13 is a conceptual data flow diagram illustrating the data flow between different means/components in an example transmitting device.

FIG. 13 is a conceptual data flow diagram 1300 illustrating the data flow between different means/components in an example base station 1302, which may be an example of the base station 102 including the PAPR reduction component 120. The PAPR reduction component 120 may include the FD response component, the channel estimation component 124, the PAPR reduction precoder 126, the MIMO precoder 128, and the precoding component 129. The PAPR reduction component 120 may optionally include a configuration component 1310 and a mapper 1320.

The base station 1302 may also include a receiver component 1350 and a transmitter component 1352. The receiver component 1350 may include, for example, a RF receiver for receiving the signals described herein. The transmitter component 1352 may include for example, an RF transmitter for transmitting the signals described herein. In some implementations, the receiver component 1350 and the transmitter component 1352 may be co-located in a transceiver such as the Tx/Rx 318 in FIG. 3.

The receiver component 1350 may receive uplink signals from UEs 104. For example, the receiver component 1350 may receive the capabilities 1210, reference signals such as SRS, or channel state feedback (CSF). The receiver component 1150 may provide the capabilities 1210 to the configuration component 1310. The receiver component 1150 may provide the SRS or CSF to the channel estimation component 124.

In some implementations, the configuration component 1310 may select the PAPR reduction precoding. For example, the configuration component 1310 may indicate a precoding perturbation rule to the PAPR reduction precoder 126. The configuration component 1310 may transmit the configuration 1220, precoding perturbation rule 1230, and/or the precoding perturbation flag 1240 to the UE 104 to configure the UE with the same PAPR reduction precoding for a transmission.

The FD response component 122 may be configured to construct an FD response to the PAPR reduction precoding. The FD response component 122 may receive the PAPR reduction precoding from the PAPR reduction precoder 126. The FD response component 122 may construct the FD response $G_i(k)$. In some implementations, the $G_i(k)$ may be a block constant response for a group of subcarriers (e.g., an RB). The FD response component 122 may provide the FD response to the MIMO precoder 128.

The channel estimation component 124 may be configured to estimate a channel to one or more receiving devices. For example, the channel estimation component 124 may receive the SRS and/or CSF via the receiver component 1350. The channel estimation component 124 may estimate the channel $H_{u,i}(k)$ to each UE based on the respective SRS and/or CSF. The channel estimation component 124 may provide the estimated channel to the PAPR reduction precoder 126.

The PAPR reduction precoder 126 may be configured to apply the PAPR reduction precoding to the estimated channel. The PAPR reduction precoder 126 may receive the estimated channel $H_{u,i}(k)$ from the channel estimation component 124. The PAPR reduction precoder 126 may generate a PAPR reduction matrix representing the estimated channel after PAPR reduction precoding $\hat{H}_{u,i}(k)$. The PAPR reduction precoder 126 may provide the PAPR reduction matrix to the precoding component 129.

The MIMO precoder 128 may be configured to construct a MIMO precoding matrix considering the FD response of the PAPR reduction precoding. The MIMO precoder 128 may receive the FD response from the FD response component 122. The MIMO precoder 128 may generate the MIMO precoding matrix $W_{u,i}(k)$ based on $\hat{H}_{u,i}(k)$. The MIMO precoder 128 may provide the MIMO precoding matrix to the precoding component 129.

In some implementations, the base station 1302 may include a mapper 1320 configured to map signals for transmission to an FD signal. For example, the mapper 1320 may receive encoded data signals such as PDSCH or reference signals. The mapper 1320 may map bits of the signals to REs to generate an FD signal. The mapper 1320 may provide the FD signal ($x_u(k)$) for transmission to the precoding component 129.

The precoding component 129 may be configured to apply the MIMO precoding matrix and the PAPR reduction precoding to the FD signal for a transmission. For example, the precoding component 129 may apply a respective MIMO precoding matrix to the FD signal for each UE to generate a beamformed signal for each UE. The precoding component 129 may apply the PAPR reduction precoding to the sum of the beamformed signals to reduce the PAPR by projecting energy into the null space. The precoding component 129 may transmit the precoded signal $Z_t(k)$ via the transmitter component 1352.

Figure 14:
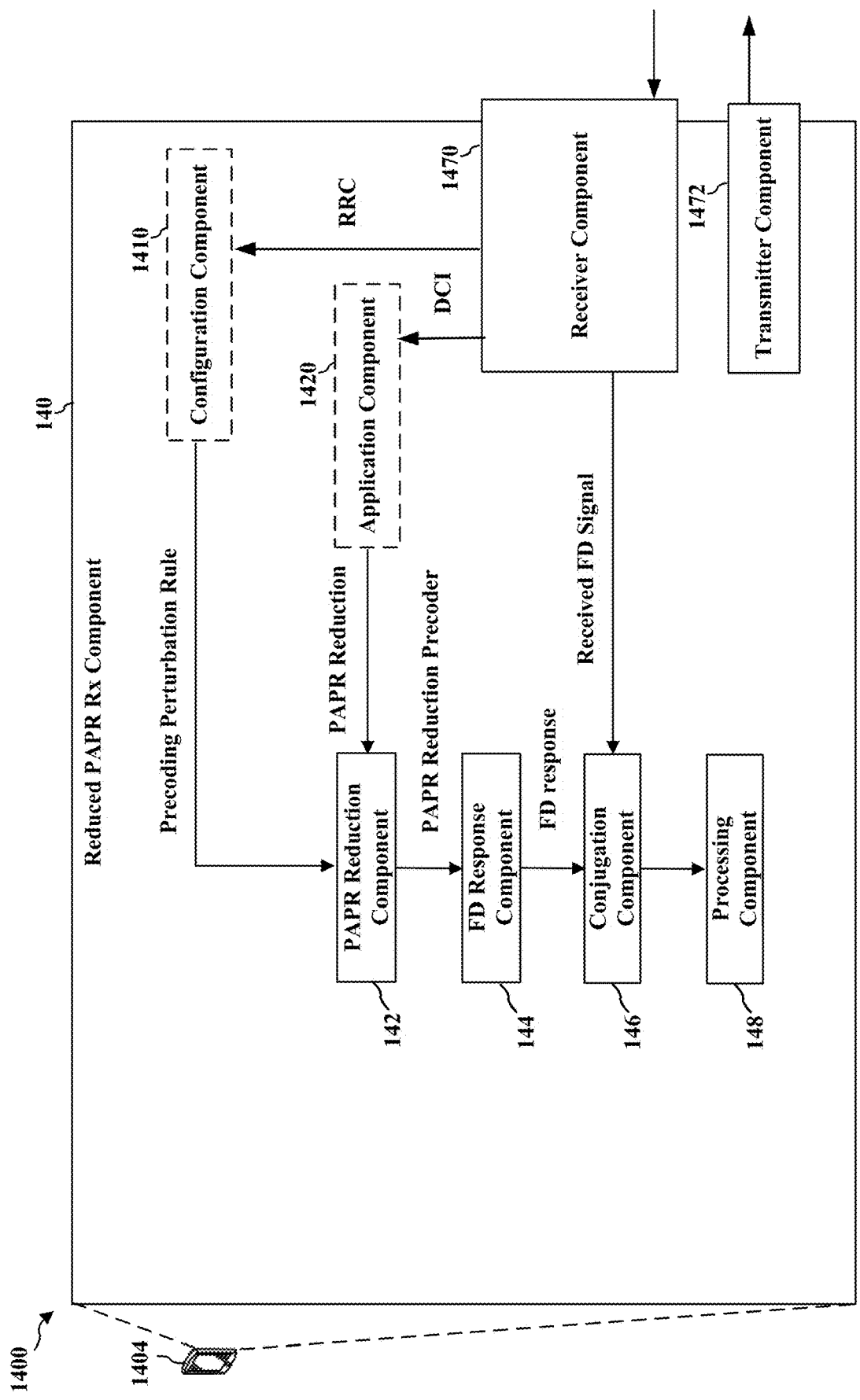
FIG. 14 is a conceptual data flow diagram illustrating the data flow between different means/components in an example receiving device.

FIG. 14 is a conceptual data flow diagram 1400 illustrating the data flow between different means/components in an example UE 1404, which may be an example of the UE 104 and include the reduced PAPR Rx component 140. As discussed with respect to FIG. 1, the reduced PAPR Rx component 140 may include the PAPR reduction component 142, the FD response component 144, the conjugation component 146, and the processing component 148. The PAPR Rx component 140 may optionally include a configuration component 1410 and/or an application component 1420.

The UE 104 also may include a receiver component 1470 and a transmitter component 1472. The receiver component 1470 may include, for example, a RF receiver for receiving the signals described herein. The transmitter component 1472 may include for example, an RF transmitter for transmitting the signals described herein. In some implementations, the receiver component 1470 and the transmitter component 1472 may be co-located in a transceiver such as the Tx/Rx 354 in FIG. 3.

The receiver component 1470 may receive downlink signals such as the configuration 1220, the precoding perturbation rule 1230, the precoding perturbation flag 1240, or the data/reference signal 1260. The receiver component 1470 may provide the configuration 1220 and/or precoding perturbation rule 1230 to the configuration component 1410. The receiver component 1470 may provide the precoding perturbation flag 1240 to the application component 1420. The receiver component 1470 may provide the data/reference signal 1260 to the to the conjugation component 146.

The configuration component 1410 may be configured to receive signaling indicating the precoding perturbation rule or parameters thereof from the transmitting device. For example, the configuration component 1410 may receive an RRC message via the receiver component 1470. The RRC message may include a configuration 1220 or precoding perturbation rule 1230. The configuration component 1410 may determine a precoding perturbation rule that may be used for PAPR reduction precoding based on the configuration 1220 and/or the precoding perturbation rule 1230. The configuration component 1410 may provide the precoding perturbation rule to the PAPR reduction component 142.

The application component 1420 may be configured to receive signaling that a PAPR reduction precoder is applied to a received FD signal. For example, the application component 1420 may receive dynamic signaling such as a DCI or MAC-CE indicating that PAPR reduction precoding applied to one or more transmissions. For example, a DCI may carry a bit for the precoding perturbation flag 1240. The application component 1420 may determine the received FD signals to which the PAPR reduction precoding is applied. The application component 1420 may provide an indication of PAPR reduction precoding to the PAPR reduction component 142.

The PAPR reduction component 142 may be configured to select a PAPR reduction precoder. For example, the PAPR reduction component 142 may select the PAPR reduction precoder based on a configured precoding perturbation rule. In some implementations, the PAPR reduction component 142 may determine one or more parameters of the precoding perturbation rule. The selected PAPR reduction precoder may be the PAPR reduction precoder used by a transmitting device for a transmission. The PAPR reduction component 142 may provide the PAPR reduction precoder to the FD response component 144.

The FD response component 144 may be configured to construct a FD response to the PAPR reduction precoder. The FD response component 144 may receive the PAPR reduction precoding from the PAPR reduction component 142. The FD response component 144 may construct the FD response $G_t(k)$. In some implementations, the $G_t(k)$ may be a block constant response for a group of subcarriers (e.g., an RB). The FD response component 144 may provide the FD response to the conjugation component 146.

The conjugation component 146 may be configured to apply the FD response conjugated to a received FD signal from a transmitting device. For example, the conjugation component 146 may receive the FD response from the FD response component 144. The conjugation component 146 may receive the FD signal from the transmitting device (e.g., base station 1302) via the receiver component 1470. The conjugation component 146 may apply the FD response conjugated to the received FD signal to generate $\tilde{y}_t(k)$, which may represent a beamformed signal transmitted by the transmitting device. The conjugation component 146 may provide $\tilde{y}_t(k)$ to the processing component 148.

The processing component 148 may be configured to process a received reference signal within the received FD signal. For example, the processing component 148 may perform channel estimation, data decoding, or tracking based on the received signal. For example, the received signal may include one or more of a data signal (PDSCH/PUSCH), a demodulation reference signal (DMRS), a tracking reference signal (TRS), a channel state information reference signal (CSI-RS), or a cell-specific reference signal (CRS). In some implementations, the data decoding may be transparent to the PAPR reduction precoding because the DMRS may be used to estimate the precoded channel. The precoding of other reference signals, however, may not be transparent, so $\tilde{y}_t(k)$ may be used.

Figure 15:
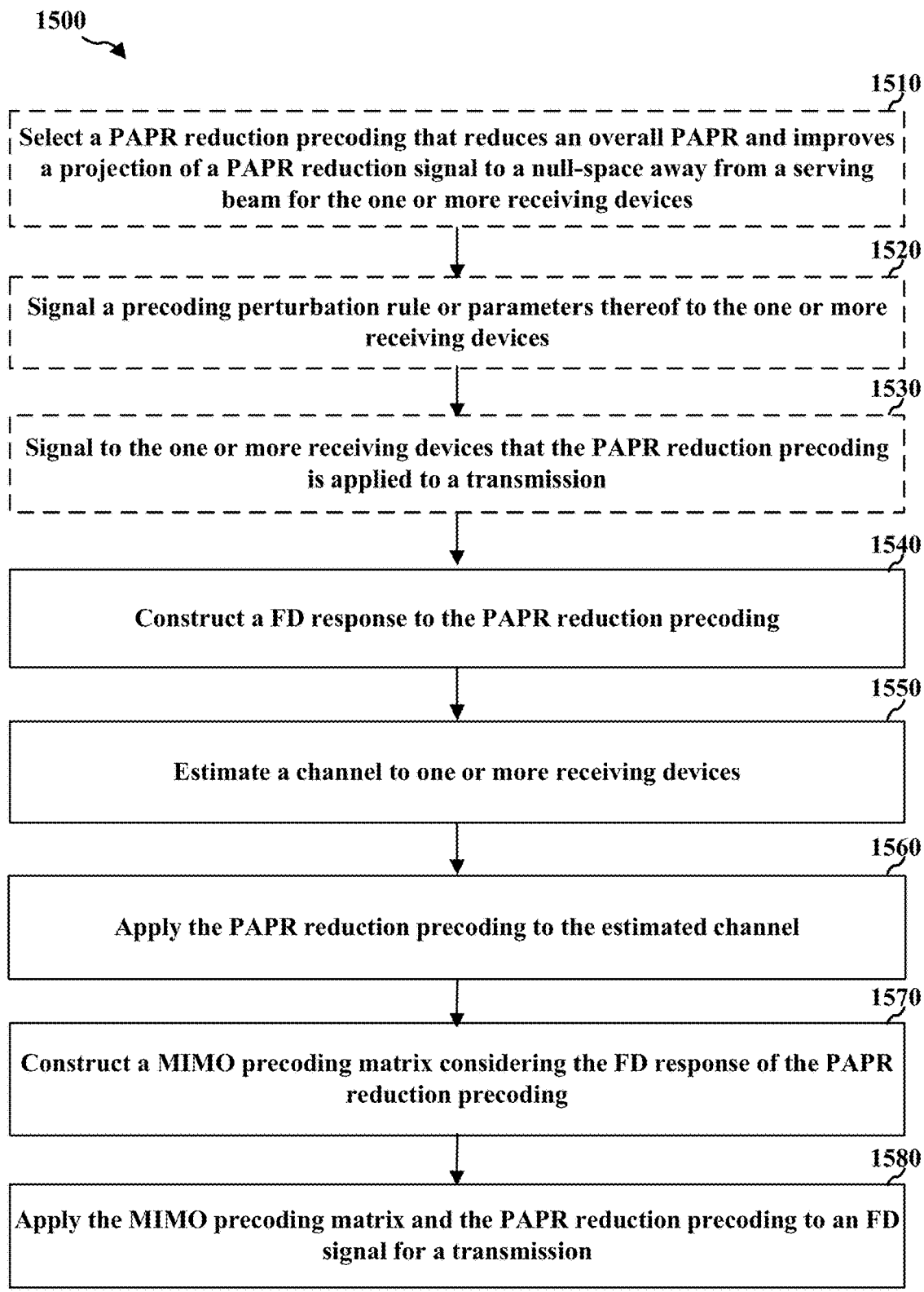
FIG. 15 a flowchart of an example method for a transmitting device to reduce PAPR using transmit precoding.

FIG. 15 a flowchart of an example method 1500 for a base station to reduce PAPR using transmit precoding. The method 1500 may be performed by a transmitting device (such as the base station 102, which may include the memory 376 and which may be the entire base station 102 or a component of the base station 102 such as the PAPR reduction component 120, Tx processor 316, the Rx processor 370, or the controller/processor 375). The method 1500 may be performed by the PAPR reduction component 120 in communication with the PAPR Rx component 140 of one or more UEs 104.

At block 1510, the method 1500 optionally includes selecting a PAPR reduction precoding that reduces an overall PAPR and improves a projection of a PAPR reduction signal to a null-space away from a serving beam for the one or more receiving devices. In some implementations, for example, the base station 102, Tx processor 316, or the controller/processor 375 may execute the PAPR reduction component 120 or the PAPR reduction precoder 126 to select a PAPR reduction precoding that reduces an overall PAPR and improves a projection of a PAPR reduction signal to a null-space away from a serving beam for the one or more receiving devices (e.g., UEs 104). In some implementations, the PAPR reduction precoding is based on a precoding perturbation rule. In some implementations, the PAPR reduction precoding includes a single tap delay on a baseline wide band precoder. Accordingly, the base station 102, Tx processor 316, or the controller/processor 375 executing the PAPR reduction component 120 or the PAPR reduction precoder 126 may provide means for selecting a PAPR reduction precoding that reduces an overall PAPR and improves a projection of a PAPR reduction signal to a null-space away from a serving beam for the one or more receiving devices.

At block 1520, the method 1500 optionally includes signaling a precoding perturbation rule or parameters thereof to the one or more receiving devices. In some implementations, for example, the base station 102, Tx processor 316, or the controller/processor 375 may execute the PAPR reduction component 120 or the configuration component 1310 to signal a precoding perturbation rule or parameters thereof to the one or more receiving devices. Accordingly, the base station 102, Tx processor 316, or the controller/processor 375 executing the PAPR reduction component 120 or the configuration component 1310 may provide means for signaling a precoding perturbation rule or parameters thereof to the one or more receiving devices.

At block 1530, the method 1500 optionally includes signaling to the one or more receiving devices that the PAPR reduction precoding is applied to a transmission. In some implementations, for example, the base station 102, Tx processor 316, or the controller/processor 375 may execute the PAPR reduction component 120 or the configuration component 1310 to signal to the one or more receiving devices that the PAPR reduction precoding is applied to a transmission. Accordingly, the base station 102, Tx processor 316, or the controller/processor 375 executing the PAPR reduction component 120 or the configuration component 1310 may provide means for signaling to the one or more receiving devices that the PAPR reduction precoding is applied to a transmission.

At block 1540, the method 1500 includes constructing a FD response to the PAPR reduction precoding. In some implementations, for example, the base station 102, Tx processor 316, or the controller/processor 375 may execute the PAPR reduction component 120 or the FD response component 122 to construct a FD response to the PAPR reduction precoding. In some implementations, the FD response is a constant response for each of a plurality of precoding blocks within a wideband precoding. Accordingly, the base station 102, Tx processor 316, or the controller/processor 375 executing the PAPR reduction component 120 or the FD response component 122 may provide means for constructing a FD response to the PAPR reduction precoding.

At block 1550, the method 1500 includes estimating a channel to one or more receiving devices. In some implementations, for example, the base station 102, Tx processor 316, or the controller/processor 375 may execute the PAPR reduction component 120 or the channel estimation component 124 to estimate a channel to one or more receiving devices. Accordingly, the base station 102, Tx processor 316, or the controller/processor 375 executing the PAPR reduction component 120 or the channel estimation component 124 may provide means for estimating a channel to one or more receiving devices.

At block 1560, the method 1500 includes applying the PAPR reduction precoding to the estimated channel. In some implementations, for example, the base station 102, Tx processor 316, or the controller/processor 375 may execute the PAPR reduction component 120 or the PAPR reduction precoder 126 to apply the PAPR reduction precoding to the estimated channel. In some implementations, applying the PAPR reduction precoding to the estimated channel is per precoding block. Accordingly, the base station 102, Tx processor 316, or the controller/processor 375 executing the PAPR reduction component 120 or the PAPR reduction precoder 126 may provide means for applying the PAPR reduction precoding to the estimated channel.

At block 1570, the method 1500 includes constructing a MIMO precoding matrix considering the FD response of the PAPR reduction precoding. In some implementations, for example, the base station 102, Tx processor 316, or the controller/processor 375 may execute the PAPR reduction component 120 or the MIMO precoder 128 to construct a MIMO precoding matrix considering the FD response of the PAPR reduction precoding. In some implementations, the MIMO precoding matrix is a codebook precoding matrix, a zero force precoding matrix, or a SVD matrix. Accordingly, the base station 102, Tx processor 316, or the controller/processor 375 executing the PAPR reduction component 120 or the MIMO precoder 128 may provide means for constructing a MIMO precoding matrix considering the FD response of the PAPR reduction precoding.

At block 1580, the method 1500 includes applying the MIMO precoding matrix and the PAPR reduction precoding to an FD signal for a transmission. In some implementations, for example, the base station 102, Tx processor 316, or the controller/processor 375 may execute the PAPR reduction component 120 or the precoding component 129 to apply the MIMO precoding matrix and the PAPR reduction precoding to an FD signal for a transmission. For example, the FD signal may include one or more of a data signal (e.g., PDSCH/PUSCH), a DMRS, a TRS, a CSI-RS, or a CRS. Accordingly, the base station 102, Tx processor 316, or the controller/processor 375 executing the PAPR reduction component 120 or the precoding component 129 may provide means for applying the MIMO precoding matrix and the PAPR reduction precoding to an FD signal for a transmission.

Figure 16:
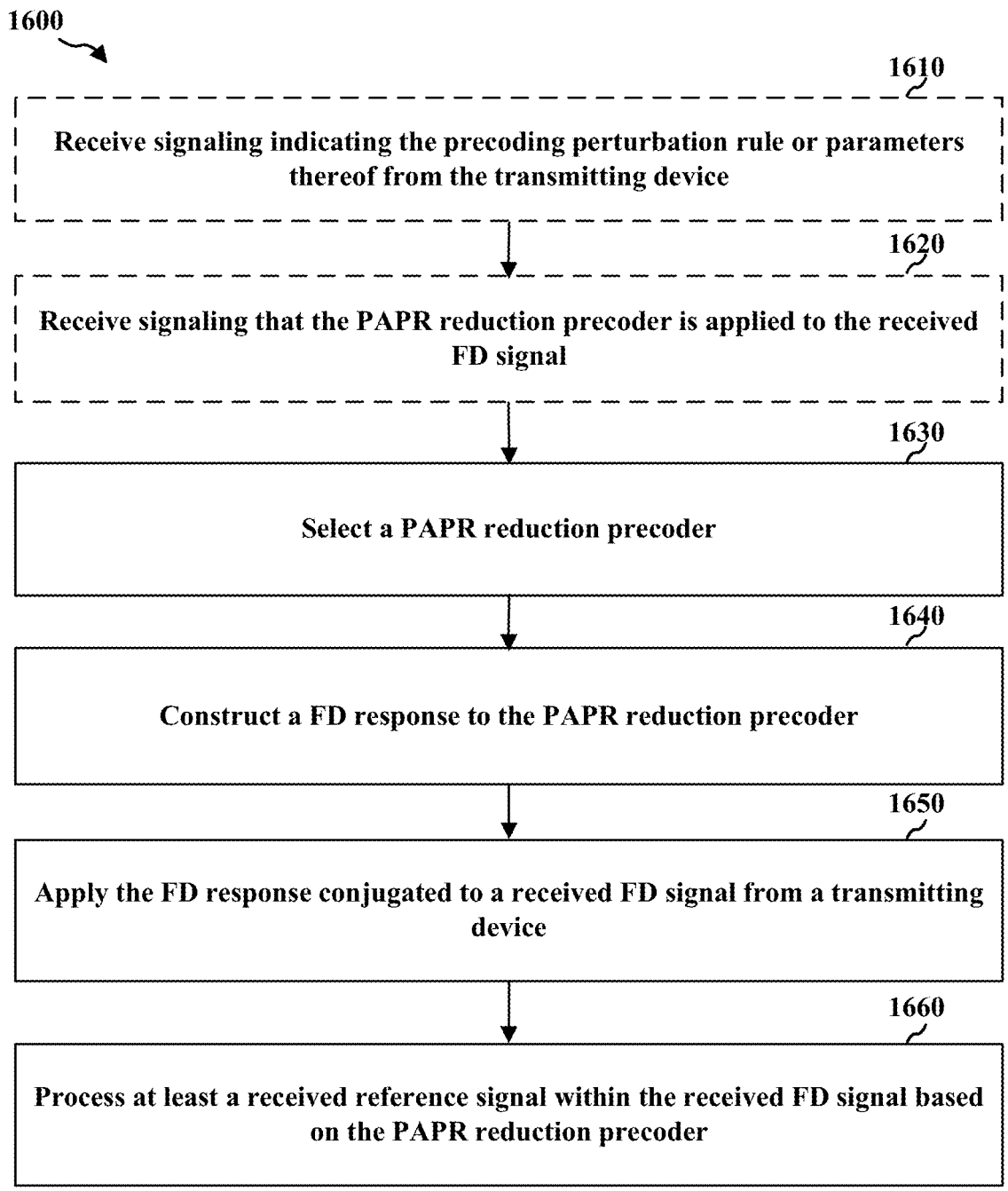
FIG. 16 is a flowchart of an example method for a receiving device to receive a signal that has been precoded with a PAPR reduction precoding.

FIG. 16 is a flowchart of an example method 1600 for a receiving device such as a UE to receive a signal that has been precoded with a PAPR reduction precoding. The method 1600 may be performed by a receiving device (such as the UE 104, which may include the memory 360 and which may be the entire UE 104 or a component of the UE 104 such as the PAPR Rx component 140, Tx processor 368, the Rx processor 356, or the controller/processor 359). The method 1600 may be performed by the PAPR Rx component 140 in communication with the PAPR reduction component 120 of the base station 102. Optional blocks are shown with dashed lines.

At block 1610, the method 1600 optionally includes receiving signaling indicating the precoding perturbation rule or parameters thereof from the transmitting device. In some implementations, for example, the UE 104, the Rx processor 356, or the controller/processor 359 may execute the PAPR Rx component 140 or the configuration component 1410 to receive signaling indicating the precoding perturbation rule or parameters thereof from the transmitting device. Accordingly, the UE 104, the Rx processor 356, or the controller/processor 359 executing the PAPR Rx component 140 or the configuration component 1410 may provide means for receiving signaling indicating the precoding perturbation rule or parameters thereof from the transmitting device.

At block 1620, the method 1600 optionally includes receiving signaling that the PAPR reduction precoder is applied to the received FD signal. In some implementations, for example, the UE 104, the Rx processor 356, or the controller/processor 359 may execute the PAPR Rx component 140 or the application component 1420 to receive signaling that the PAPR reduction precoder is applied to the received FD signal. Accordingly, the UE 104, the Rx processor 356, or the controller/processor 359 executing the PAPR Rx component 140 or the application component 1420 may provide means for receiving signaling that the PAPR reduction precoder is applied to the received FD signal.

At block 1630, the method 1600 includes selecting a PAPR reduction precoder. In some implementations, for example, the UE 104, the Rx processor 356, or the controller/processor 359 may execute the PAPR Rx component 140 or the PAPR reduction component 142 to select a PAPR reduction precoder. Accordingly, the UE 104, the Rx processor 356, or the controller/processor 359 executing the PAPR Rx component 140 or the PAPR reduction component 142 may provide means for selecting a PAPR reduction precoder.

At block 1640, the method 1600 includes constructing a FD response to the PAPR reduction precoder. In some implementations, for example, the UE 104, the Rx processor 356, or the controller/processor 359 may execute the PAPR Rx component 140 or the FD response component 144 to construct a FD response to the PAPR reduction precoder. Accordingly, the UE 104, the Rx processor 356, or the controller/processor 359 executing the PAPR Rx component 140 or the FD response component 144 may provide means for constructing a FD response to the PAPR reduction precoder.

At block 1650, the method 1600 includes applying the FD response conjugated to a received FD signal from a transmitting device. In some implementations, for example, the UE 104, the Rx processor 356, or the controller/processor 359 may execute the PAPR Rx component 140 or the conjugation component 146 to apply the FD response conjugated to a received FD signal from a transmitting device. Accordingly, the UE 104, the Rx processor 356, or the controller/processor 359 executing the PAPR Rx component 140 or the conjugation component 146 may provide means for applying the FD response conjugated to a received FD signal from a transmitting device.

At block 1660, the method 1600 includes processing at least a received reference signal within the received FD signal based on the PAPR reduction precoder. In some implementations, for example, the UE 104, the Rx processor 356, or the controller/processor 359 may execute the PAPR Rx component 140 or the processing component 148 to process at least the received reference signal within the received FD signal based on the PAPR reduction precoder. For example, in some implementations, the received FD signal includes one or more of a data signal, a DMRS, a TRS, a CSI-RS, or a CRS. Depending on the PAPR reduction precoder, the precoding may be transparent for the data signal (e.g., based on precoded DMRS) or the processing component 148 may process the data signal based on the PAPR reduction precoder. Accordingly, the UE 104, the Rx processor 356, or the controller/processor 359 executing the PAPR Rx component 140 or the processing component 148 may provide means for processing a received reference signal within the received FD signal based on the PAPR reduction precoder.

Some Further Example Clauses

Implementation examples are described in the following numbered clauses:

1. A method of wireless communication at a transmitting device, comprising:
   constructing a frequency domain (FD) response to a peak to average power ratio (PAPR) reduction precoding;
   estimating a channel to one or more receiving devices;
   applying the PAPR reduction precoding to the estimated channel;
   constructing a multiple input multiple output (MIMO) precoding matrix considering the FD response of the PAPR reduction precoding; and
   applying the MIMO precoding matrix and the PAPR reduction precoding to an FD signal for a transmission.

2. The method of clause 1, further comprising selecting the PAPR reduction precoding that reduces an overall PAPR and improves a projection of a PAPR reduction signal to a null-space away from a serving beam for the one or more receiving devices.

3. The method of clause 1 or 2, wherein the FD response is a constant response for each of a plurality of precoding blocks within a wideband precoding.

4. The method of clause 3, wherein applying the PAPR reduction precoding to the estimated channel is per precoding block.

5. The method of any of clauses 1-4, wherein the PAPR reduction precoding is based on a precoding perturbation rule.

6. The method of clause 5, wherein the PAPR reduction precoding includes a single tap delay on a baseline wide band precoder.

7. The method of clause 5, further comprising signaling the precoding perturbation rule or parameters thereof to the one or more receiving devices.

8. The method of any of clauses 1-7, further comprising signaling to the one or more receiving devices that the PAPR reduction precoding is applied to the transmission.

9. The method of any of clauses 1-8, wherein the FD signal includes one or more of a data signal, a demodulation reference signal (DMRS), a tracking reference signal (TRS), a channel state information reference signal (CSI-RS), or a cell-specific reference signal (CRS).

10. The method of any of clauses 1-9, wherein the MIMO precoding matrix is a codebook precoding matrix, a zero force precoding matrix, or a singular value decomposition (SVD) matrix.

11. An apparatus for wireless communication for a transmitting device, comprising:
   a memory storing computer-executable instructions; and
   at least one processor coupled to the memory and configured to execute the computer-executable instructions to perform the method of any of clauses 1-10.

12. An apparatus for wireless communication for a transmitting device, comprising means for performing the method of any of clauses 1-10.

13. A non-transitory computer-readable medium storing computer executable code, the code when executed by a processor of a transmitting device causes the processor to perform the method of any of clauses 1-10.

14. A method of wireless communication at a receiving device, comprising:
selecting a peak to average power reduction ratio (PAPR) reduction precoder;
constructing a frequency domain (FD) response to the PAPR reduction precoder;
applying the FD response conjugated to a received FD signal from a transmitting device; and
processing at least a received reference signal within the received FD signal based on the PAPR reduction precoder.

15. The method of clause 14, wherein the FD response is a constant response for each of a plurality of precoding blocks within a wideband precoding.

16. The method of clause 15, wherein applying the FD response conjugated to the received FD signal is per precoding block.

17. The method of any of clauses 14-16, wherein selecting the PAPR reduction precoder is based on a precoding perturbation rule.

18. The method of clause 17, wherein the PAPR reduction precoder includes a single tap delay on a baseline wide band precoder.

19. The method of clause 17, further comprising receiving signaling indicating the precoding perturbation rule or parameters thereof from the transmitting device.

20. The method of any of clauses 14-19, further comprising receiving signaling that the PAPR reduction precoder is applied to the received FD signal.

21. The method of any of clauses 14-20, wherein the received FD signal includes one or more of a data signal, a demodulation reference signal (DMRS), a tracking reference signal (TRS), a channel state information reference signal (CSI-RS), or a cell-specific reference signal (CRS).

22. An apparatus for wireless communication for a receiving device, comprising:
a memory storing computer-executable instructions; and
at least one processor coupled to the memory and configured to execute the computer-executable instructions to perform the method of any of clauses 14-21.

23. An apparatus for wireless communication for a receiving device, comprising means for performing the method of any of clauses 14-21.

24. A non-transitory computer-readable medium storing computer executable code, the code when executed by a processor of a receiving device causes the processor to perform the method of any of clauses 14-21.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a transmitting device, comprising:
constructing a frequency domain (FD) response to a peak to average power ratio (PAPR) reduction precoding;
estimating a channel to one or more receiving devices;
applying the PAPR reduction precoding to the estimated channel;
constructing a multiple input multiple output (MIMO) precoding matrix considering the FD response of the PAPR reduction precoding; and
applying the MIMO precoding matrix and the PAPR reduction precoding to an FD signal for a transmission, the FD signal includes one or more of a data signal, a demodulation reference signal (DMRS), a tracking reference signal (TRS), a channel state information reference signal (CSI-RS), or a cell-specific reference signal (CRS).

2. The method of claim 1, further comprising selecting the PAPR reduction precoding that reduces an overall PAPR and improves a projection of a PAPR reduction signal to a null-space away from a serving beam for the one or more receiving devices.

3. The method of claim 1, wherein the FD response is a constant response for each of a plurality of precoding blocks within a wideband precoding.

4. The method of claim 3, wherein applying the PAPR reduction precoding to the estimated channel is per precoding block.

5. The method of claim 1, wherein the PAPR reduction precoding is based on a precoding perturbation rule.

6. The method of claim 5, wherein the PAPR reduction precoding includes a single tap delay on a baseline wide band precoder.

7. The method of claim 5, further comprising signaling the precoding perturbation rule or parameters thereof to the one or more receiving devices.

8. The method of claim 1, further comprising signaling to the one or more receiving devices that the PAPR reduction precoding is applied to the transmission.

9. The method of claim 1, wherein the MIMO precoding matrix is a codebook precoding matrix, a zero force precoding matrix, or a singular value decomposition (SVD) matrix.

10. A method of wireless communication at a receiving device, comprising:

selecting a peak to average power reduction ratio (PAPR) reduction precoder;
constructing a frequency domain (FD) response to the PAPR reduction precoder;
applying the FD response conjugated to a received FD signal from a transmitting device; and
processing at least a received reference signal within the received FD signal based on the PAPR reduction precoder, the received FD signal includes one or more of a data signal, a demodulation reference signal (DMRS), a tracking reference signal (TRS), a channel state information reference signal (CSI-RS), or a cell-specific reference signal (CRS).

11. The method of claim 10, wherein the FD response is a constant response for each of a plurality of precoding blocks within a wideband precoding.

12. The method of claim 11, wherein applying the FD response conjugated to the received FD signal is per precoding block.

13. The method of claim 10, wherein selecting the PAPR reduction precoder is based on a precoding perturbation rule.

14. The method of claim 13, wherein the PAPR reduction precoder includes a single tap delay on a baseline wide band precoder.

15. The method of claim 13, further comprising receiving signaling indicating the precoding perturbation rule or parameters thereof from the transmitting device.

16. The method of claim 10, further comprising receiving signaling that the PAPR reduction precoder is applied to the received FD signal.

17. A transmitting device, comprising:
a memory storing computer-executable instructions; and
at least one processor coupled to the memory and configured to execute the computer-executable instructions to:
construct a frequency domain (FD) response to a peak to average power ratio (PAPR) reduction precoding;
estimate a channel to one or more receiving devices;
apply the PAPR reduction precoding to the estimated channel;
construct a multiple input multiple output (MIMO) precoding matrix considering the FD response of the PAPR reduction precoding; and
apply the MIMO precoding matrix and the PAPR reduction precoding to an FD signal for a transmission, the FD signal includes one or more of a data signal, a demodulation reference signal (DMRS), a tracking reference signal (TRS), a channel state information reference signal (CSI-RS), or a cell-specific reference signal (CRS).

18. The transmitting device of claim 17, wherein the at least one processor is configured to select the PAPR reduction precoding that reduces an overall PAPR and improves a projection of a PAPR reduction signal to a null-space away from a serving beam for the one or more receiving devices.

19. The transmitting device of claim 17, wherein the FD response is a constant response for each of a plurality of precoding blocks within a wideband precoding.

20. The transmitting device of claim 19, wherein the at least one processor is configured to apply the PAPR reduction precoding to the estimated channel per precoding block.

21. The transmitting device of claim 17, wherein the PAPR reduction precoding is based on a precoding perturbation rule.

22. The transmitting device of claim 17, wherein the PAPR reduction precoding includes a single tap delay on a baseline wide band precoder.

23. A receiving device, comprising:
a memory storing computer-executable instructions; and
at least one processor coupled to the memory and configured to execute the computer-executable instructions to:
select a peak to average power ratio (PAPR) reduction precoder;
construct a frequency domain (FD) response to the PAPR reduction precoder;
apply the FD response conjugated to a received FD signal from a transmitting device; and
process at least a received reference signal within the received FD signal based on the PAPR reduction precoder, the received FD signal includes one or more of a data signal, a demodulation reference signal (DMRS), a tracking reference signal (TRS), a channel state information reference signal (CSI-RS), or a cell-specific reference signal (CRS).

24. The receiving device of claim 23, wherein the FD response is a constant response for each of a plurality of precoding blocks within a wideband precoding.

25. The receiving device of claim 24, wherein the at least one processor is configured to apply the FD response conjugated to the received FD signal per precoding block.

26. The receiving device of claim 23, wherein the at least one processor is configured to select the PAPR reduction precoder based on a precoding perturbation rule.

27. The receiving device of claim 23, wherein the received reference signal includes one or more of a demodulation reference signal (DMRS), a tracking reference signal (TRS), a channel state information reference signal (CSI-RS), or a cell-specific reference signal (CRS).

* * * * *